Jan. 12, 1965   C. A. PLASKETT   3,165,432
METHOD OF COATING A POROUS SHEET MATERIAL BY EXTRUSION
Filed March 16, 1960   8 Sheets-Sheet 1
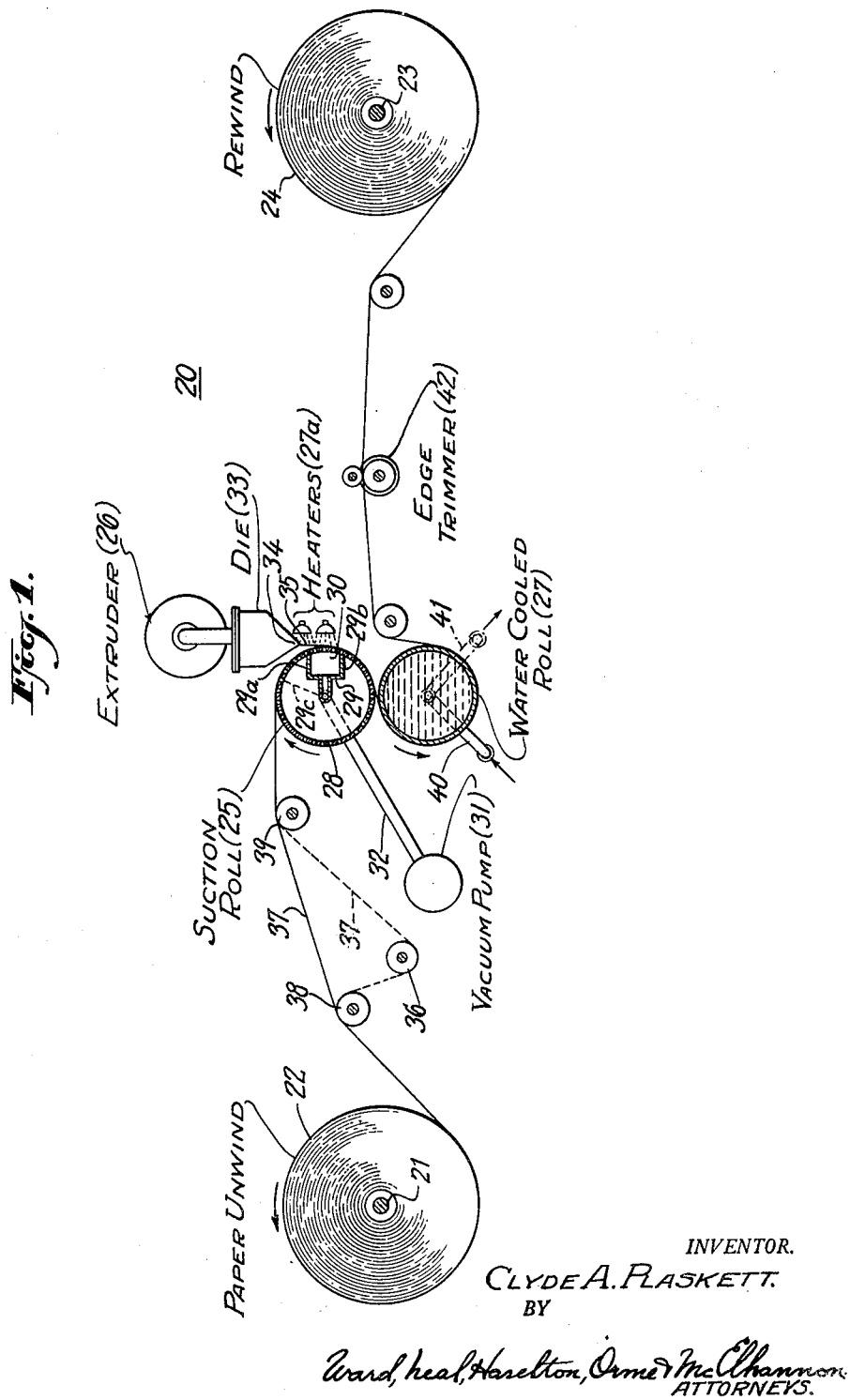
INVENTOR.
CLYDE A. PLASKETT.
BY
Ward, Neal, Haselton, Orme & McChannon
ATTORNEYS.

Jan. 12, 1965  C. A. PLASKETT  3,165,432
METHOD OF COATING A POROUS SHEET MATERIAL BY EXTRUSION
Filed March 16, 1960  8 Sheets-Sheet 2
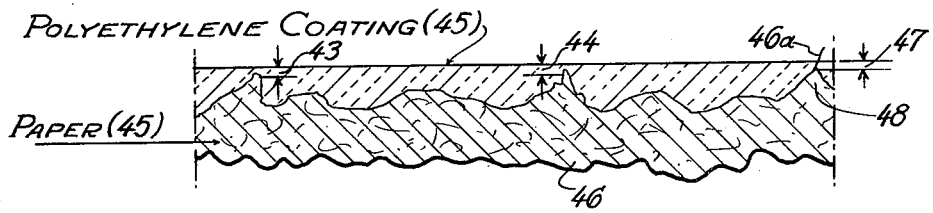
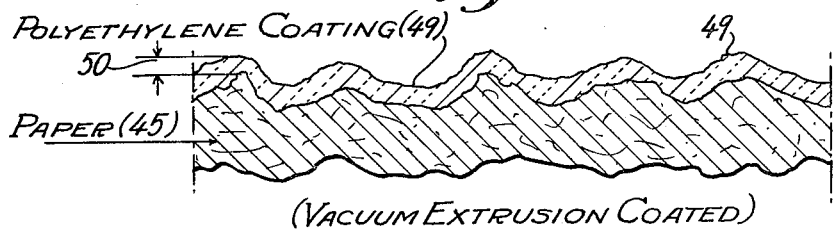
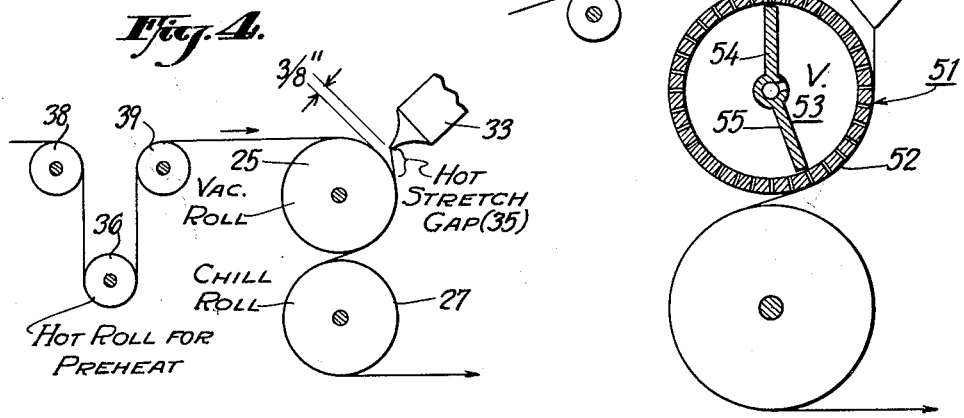
INVENTOR.
CLYDE A. PLASKETT Jan. 12, 1965   C. A. PLASKETT   3,165,432
METHOD OF COATING A POROUS SHEET MATERIAL BY EXTRUSION
Filed March 16, 1960   8 Sheets-Sheet 3
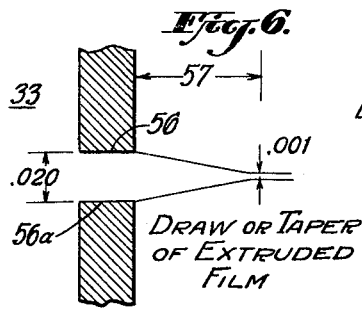
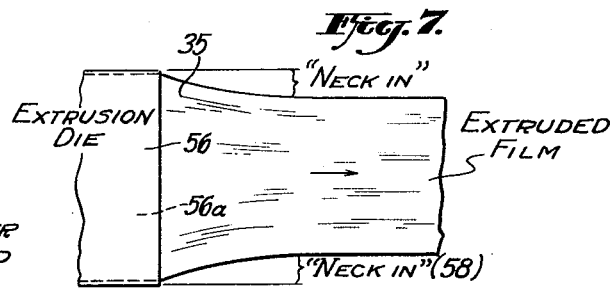
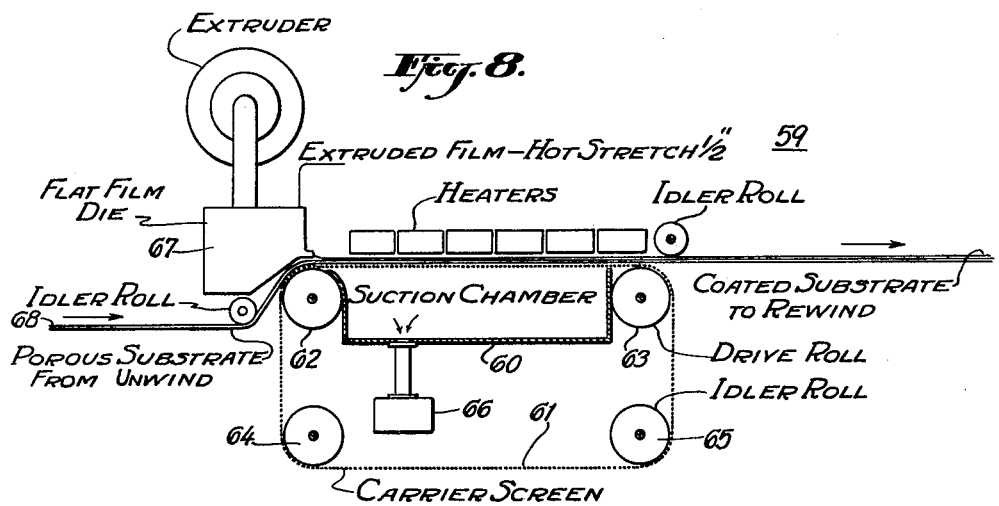
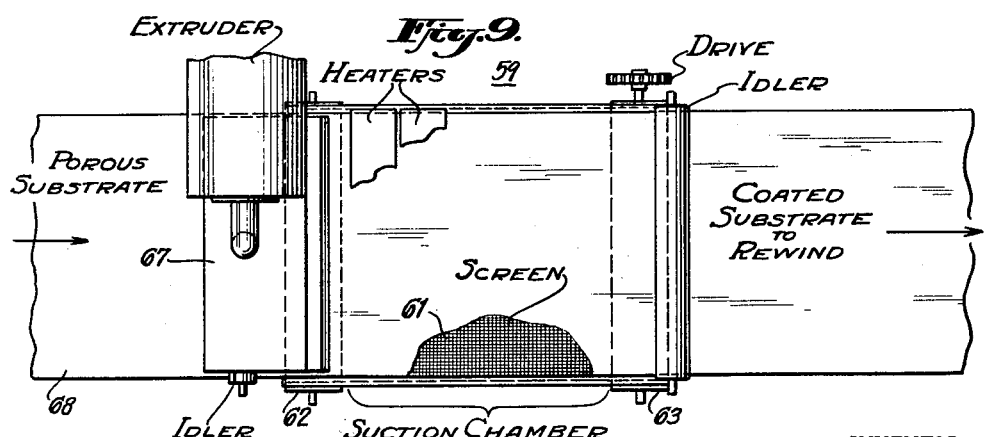
INVENTOR.
CLYDE A. PLASKETT.
BY
ATTORNEYS.

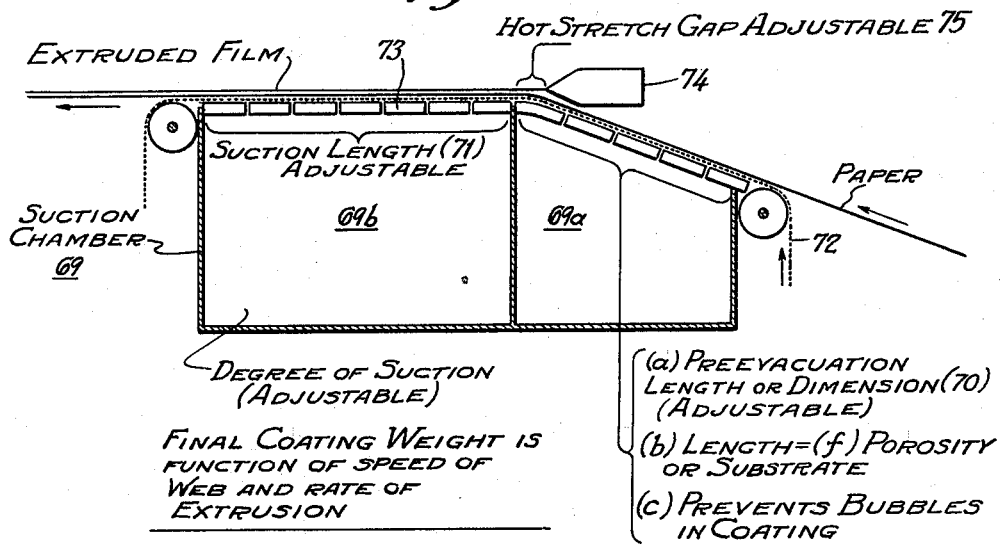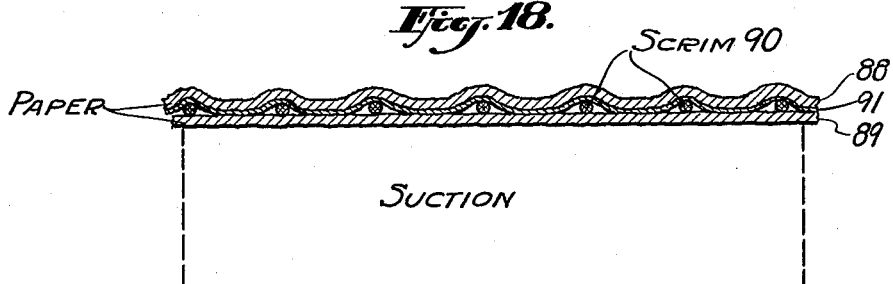

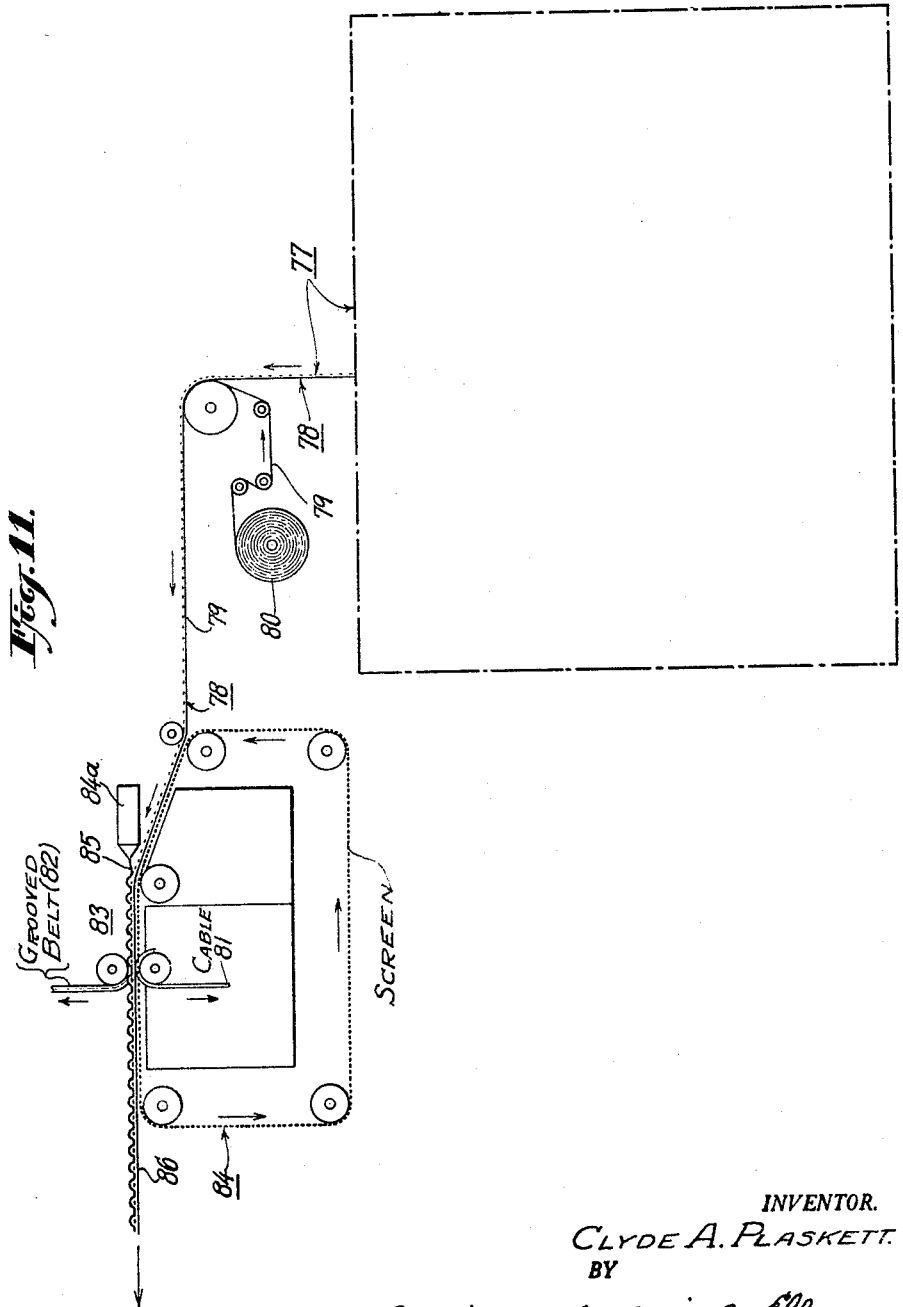

Jan. 12, 1965 C. A. PLASKETT 3,165,432
METHOD OF COATING A POROUS SHEET MATERIAL BY EXTRUSION
Filed March 16, 1960 8 Sheets-Sheet 6
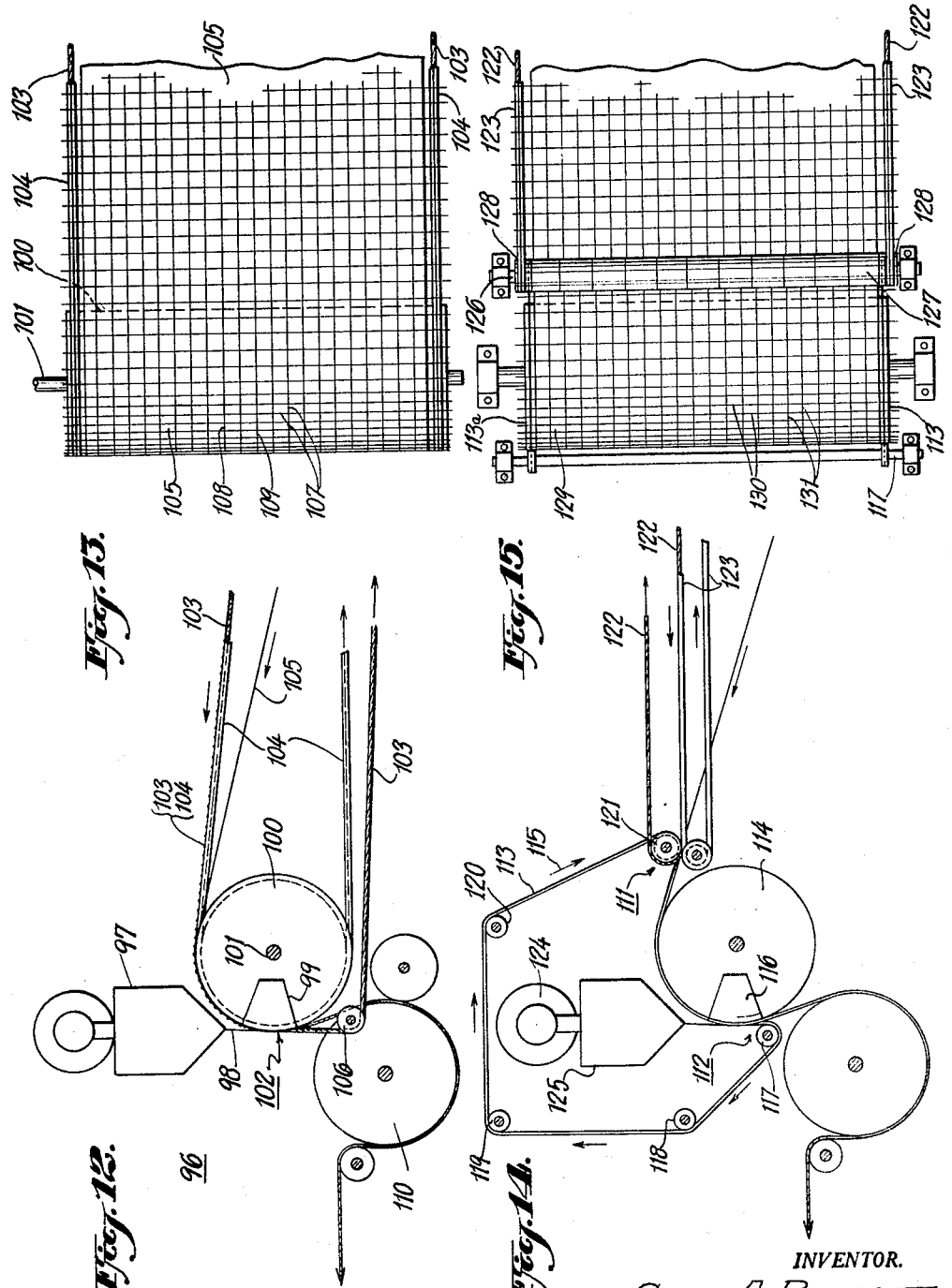
INVENTOR.
CLYDE A. PLASKETT.
BY
ATTORNEYS.

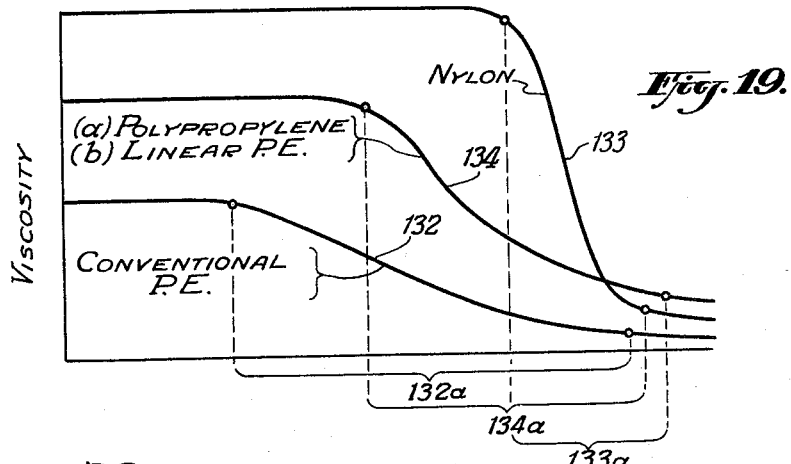
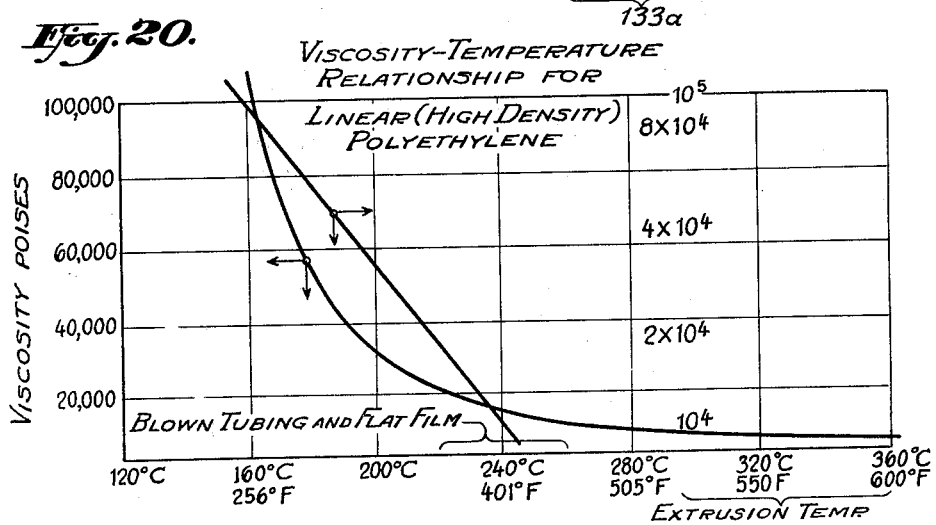
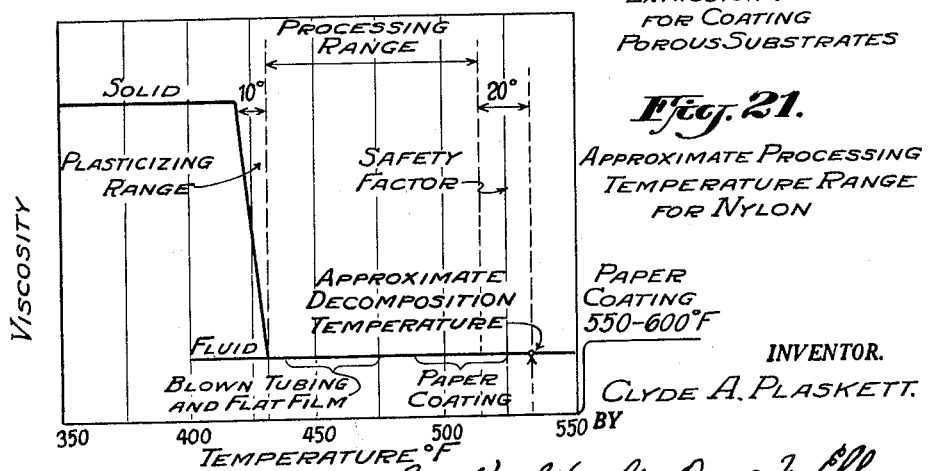

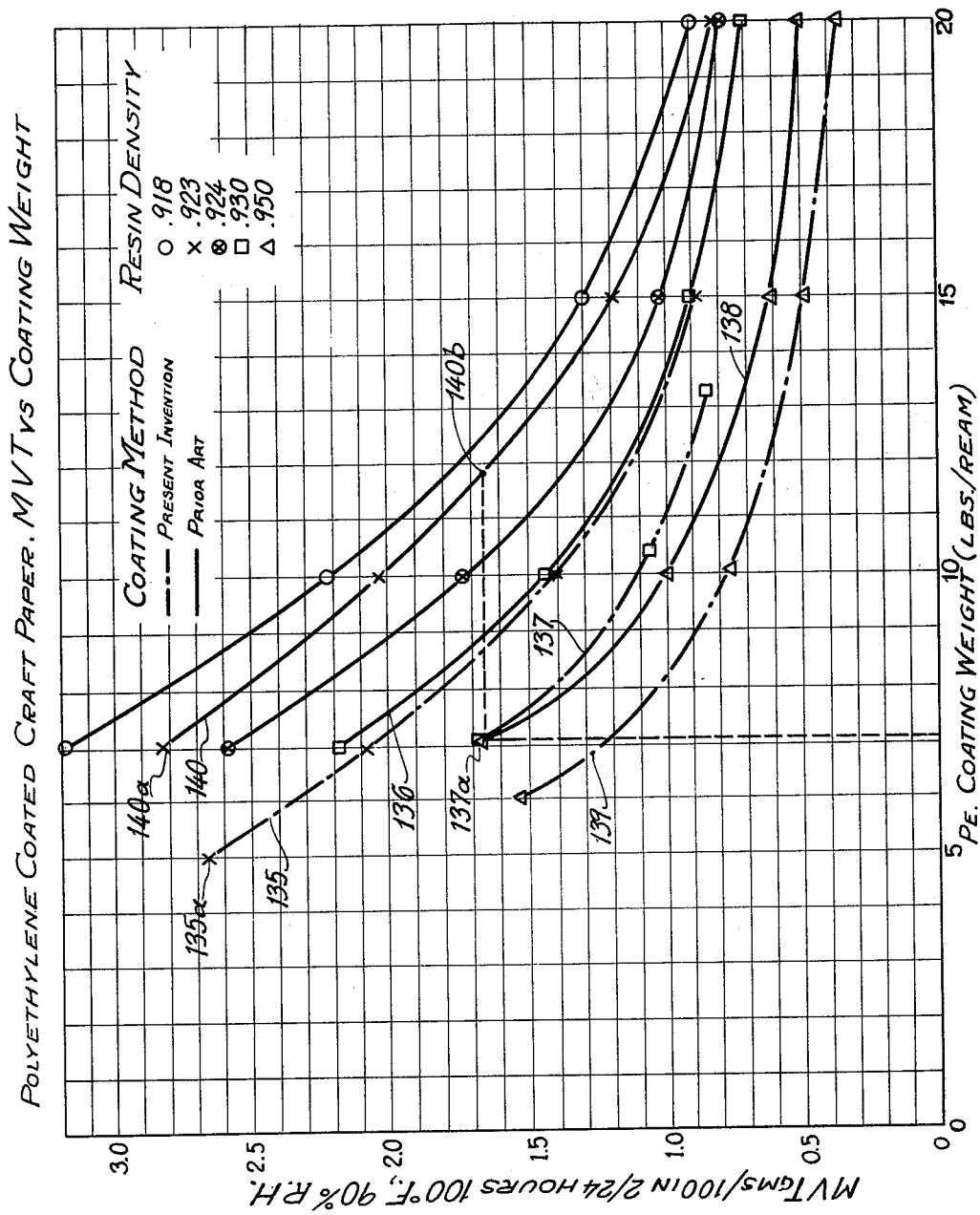

United States Patent Office 3,165,432
Patented Jan. 12, 1965

3,165,432
METHOD OF COATING A POROUS SHEET MATERIAL BY EXTRUSION
Clyde A. Plaskett, Ardsley, N.Y., assignor to St. Regis Paper Company, New York, N.Y., a corporation of New York
Filed Mar. 16, 1960, Ser. No. 15,451
9 Claims. (Cl. 156—244)

This invention relates to the coating of porous sheet material, such as paper, cloth, fabrics, both woven and non-woven and the like, with a film of extrudable thermoplastic resin including the polyolefins, particularly polyethylene, and more particularly the invention relates to a novel method and apparatus for continuously coating a web of rapidly moving porous sheet material while vacuum is applied to one side thereof, the thermoplastic film being extruded while molten onto the opposite side of the web and over the region where such vacuum is applied.

Apparatus and methods of the prior art have heretofore been proposed for applying film-like thin coatings of thermoplastic resins including polymers and copolymers to such webs of porous sheet material, generally referred to herein as porous substrates. Such prior art methods are subject to the disadvantage in that the properties of the resulting sheet or laminate are defecive because they, from a number of viewpoints, are inadequate for commercial purposes by comparison with embodiments of the present invention. For example, in the past it has been difficult to coat such substrates with a thin film of ethylene polymers or polyamides by spreading same in a hot melt condition, this being due to the high melt viscosities and inadequate stability of the substances at their melting temperaures. Furthermore, the substrate and is thin film coating, formed by the prior art aforementioned, have relatively poor adhesion. Past attempts have been made to remedy this by the use of calendering equipment to increase the pressure acting on the laminae and thereby to increase the bond between the polymer and the sheet. However, apparatus for accomplishing this is extremely costly and, it has been established, will not in fact accomplish the desired result with respect to all polymers of the class aforementioned and particularly synthetic linear polymers of sharp melting point. Furthermore, the aforementioned polyamides are too readily oxidized at the high temperatures which are required for calendering.

The prior art also has suggested the improvement of the bond between such polymer coating and the porous substrate by the use of adhesives. However, the product of such techniques embodies substantial disadvantages since the adhesive is usually inferior to that of the polymer selected for a particular application.

One of the objects of the present invention is to provide a process for applying films of thermoplastic resins, and particularly synthetic linear polymers of sharp melting point, to porous substrates with the aid of vacuum applied to the side of the porous substrate opposite to that of the application of the film.

A furher object is to provide a process of the aforementioned nature which can effect heretofore unattained savings wtih respect to the amount of plastic required, thereby effecting substantial savings in the cost of carrying out such coating method.

A further object is to provide such a method whereby a strong bond is achieved between the film and the porous substrate to a degree not heretofore attained, the film being of a light weight not heretofore attained and without the use of an intermediate adhesive layer.

Another object is to provide a method of the above character for applying very thin films of solid ethylene polymers, chlorinated solid ethylene polymers, and polyamides to porous substrates, such as paper and with the aid of the aforementioned vacuum.

The aforementioned objects are accomplished in accordance with one form of the present invention by a method for continuously applying such film of a normally solid synthetic linear polymer of sharp melting point to a moving porous substrate web of a material which may be but is not necessarily different from that of the film. Such method comprises the steps of extruding a continuous molten film of such polymer of a width approximately corresponding to that of the porous substrate and locating the point of extrusion of the film such that there is an air gap of selected small value between the same and the point of contact of the film with the porous substrate. The aforementioned is accomplished while subjecting the porous substrate to a vacuum on the side thereof opposite to the side on which the pastic film is applied and while avoiding the removal of heat from the surface of the porous substrate and the molten film, thereby to insure that an adequate adhesion and bonding of the laminae takes place. The above method takes place at rate between 500 and 1200 feet per minute, although the invention is not limited to such speed, there being presently no known upper or lower limit to the speed of such coating, and whereby there is obtained by this method a sheet having a smooth polymer coating of uniform thickness which follows the irregularities of the surface of the paper comprising substantial hills and valleys if viewed in magnified cross-section, the coating ranging in thickness down to 0.10 mil.

The synthetic linear polymer of sharp melting point and in molten form may be at any temperature above the melting point of the polymer when extruded and applied to the web, such temperature, of course, being below its decomposition point, the film being later reduced in temperature below its solidification point but only after there has been achieved the aforementioned adhesion of the film to the porous substrate. The temperature of the porous substrate at the point of contact or line of contact with the film is not necessarily critical in some forms of the invention, although in other forms where it is desired to maintain heat in the film to assist the bond, the substrate may be preheated. The degree of vacuum applied to such opposite side of the porous substrate relative to the film application side is a function of the porosity of the substrate.

The aforementioned film of plastic in one form of the invention is produced from a normally solid synthetic linear polymer of sharp melting point, as aforementioned, and from the group consisting of ethylene polymers, chlorinated ethylene polymers having preferably a chlorine content of 20% to 40%, and polyamides. Certain preferred temperature ranges peculiar to each of these polymers should be employed to facilitate the operation of the method and to enhance the quality of the product which exhibits the strongest degree of adhesion between the porous substrate and such film. The film also can be formed from a formaldehyde polymer, for example, of the type known as Du Pont Delrin, which is a long chain polymer of single molecules or monomers, the molecular structure comprising one carbon atom, one oxygen, two hydrogen, and being a straight chain without side branches. Thus the formaldehyde polymer chain can pack together tightly giving this plastic symmetrical geometry, high crystallinity, and great strength. This particular polymer is also referred to as an acetal resin and specifically as superpolyoxymethylene. Like a metal, the aforementioned polymer superpolyoxymethylene has a well defined melting point of 347° F. As a result, it can be characterized as having a sharp melting point. This acetal resin, when in substantial thickness, is difficult to bend and when bent recovers in a manner somewhat similar to spring steel. Thus if a coating of substantial thickness were extruded upon a porous substrate, the product would tend to have such qualities. Furthermore, superpolyoxymethylene resists abrasion better than some metals and its friction coefficient is not only very low but also constant for starting and operating motion. Furthermore, because it is a non-conductor electrically, circuits can be "printed" on it and as a result this resin when laminated or bonded to paper can produce an extremely inexpensive base on which circuits may be "printed," this laminate being economical for this purpose because the porous substrate can provide a suitable support for the thin film of such circuit printable plastic. Furthermore, such acetal resin, despite its formaldehyde origin, is odorless, tasteless, non-toxic, and is pleasant and smooth to the touch. Accordingly, it has substantial advantages in connection with the formation of containers for foods and beverages. The resin Delrin furthermore is thermoplastic like nylon or polyethylene rather than a thermoset like the phenolics. Also, this acetate resin is highly resistant to salt or a salt water environment and as a result a porous substrate laminated thereto is particularly advantageous for the purpose of containing salt or chemicals having salt characteristics.

Reverting to the aforementioned ethylene polymers, as a film thereof, molten in condition, contacts a porous substrate, the temperature thereof may be, for example, between 120° C. to 340° C. Preferably, it is between 220° C. and 310° C. The film should be reduced in temperature to between 10-50° C., preferably between 45° C. and 65° C., and in the case of chlorinated ethylene polymers, the molten film may be at a temperature 120° C. to 190° C. but preferably between 135° C. and 160° C. at the time of contact with the porous substrate. The same chilling temperatures, as noted above, are preferred.

Regarding the use of a polyamide as the extruded film, it has been found that it may be employed at a temperature between the melting point of the polyamide and 300° C., but preferably not in excess of 275° C. Polyamides of this character can be subdivided into one group having relatively high melting point and another group of relatively low melting point. Regarding the high melting point group, it is preferred to have the film of a temperature of at least 235° C. as it contacts the porous substrate while a lower minimum temperature of 190° C. is preferred for the other group. The plastic film should be chilled to 10° C.–120° C. in the case of all of such polyamides and it has been found advantageous that a more limited range of 20° C.–100° C. can be employed.

Regarding the temperature of the porous substrate, the latter as it contacts the plastic film may vary widely in temperature, for example, from 10° C. to 200° C. is suitable but a temperature of 100° C. to 120° C. is somewhat preferred in that it tends to improve the bond between the film and the sheet. There is a slight advantage in the latter aspect but counterweighted against this is an offsetting disadvantage of having to preheat the porous substrate so that usually there is not much preference for the preheating procedure, except when it is desirable to obtain very thin films having maximum adhesion to the porous substrate. While it is necessary to chill the molten plastic to a temperature below its solidification point after adequate penetration into the substrate, the higher the chilling temperature short of encountering difficulties, the better is the bond between the porous substrate and the plastic. Accordingly, the novel method will be carried out while employing the highest feasible chilling temperature which will not cause the resin to adhere to the apparatus, for example, to the chill roll.

As aforementioned, the temperature of such molten plastic when it engages the porous substrate can be anywhere between the melting point of the polymer and its decomposition point. However, each polymer has a preferred temperature range which is appreciably above its melting point and which gives the smoothest and least difficult carrying out of the method and also the best product with respect to the degree of adhesion of the film to the porous substrate and also uniformity of thickness of the film. In carrying out the novel method, such particular temperature ranges for the plastic of the various polymers form an important factor where a strong bond between the plastic and the porous substrate is to be effected.

The invention further relates to a coating method wherein a solvent or dispersion type coating substance is employed.

Method and apparatus of the prior art have been incapable of producing at high speed a porous substrate coated with very light plastic films and at the same time achieve a high degree of adhesion.

Furthermore, prior art methods and apparatus of this character and articles produced thereby comprising porous substrates coated with a thermoplastic resin have suffered not only from the low speed and inability to apply extremely lightweight coatings thereto but also from ease of delamination of the article, this being the result of inadequate adhesion and being caused inter alia by the plastic film, as in prior apparatus, sticking to cold metallic roll surfaces.

Furthermore, the prior art has failed to achieve adequate control of the adhesion of the laminate as herein envisioned to give a desired adhesion required for a large variety of specific applications. That is, the prior art has failed to provide adequate control of the adhesion between the limit wherein there is substantially no adhesion to one causing internal parting and destruction of the paper fibers when the plastic film is delaminated therefrom.

Furthermore, in prior art methods and apparatus and also the articles of the prior art produced thereby, there have been substantial difficulties encountered in connection with the formation of edge beads. This requires a means for trimming the edges and produces a substantial percentage of scrap.

Furthermore, in methods and apparatus of the prior art heretofore proposed, there has been a substantial so-called "hot stretch gap" between the extrusion die and the nip roll, this expression referring to the dimension between the lip of such die and the point where the extruded plastic coating is pressed between two rolls. This has necessitated undesirably high temperatures of the plastic and has resulted in oxidation and thermal degradation of the resin or plastic so extruded. In certain forms of the present invention such oxidation is not desired but in other forms it is considered advantageous as will be set forth below.

Accordingly, one of the objects of the present invention is to overcome the above disadvantages or to reduce the same to insignificance.

A further object of one form of the invention is to provide a novel coating method which has heretofore unattained advantages from a commercial point of view in that it is highly economical of plastic, and which method produces a product having substantial advantages as to quality over that of the prior art. In particular, it is one of the objects of one form of the invention to provide a novel coating method of the above character which is capable of coating a porous substrate, such as natural kraft paper of 40 pound weight, with a coating of polyethylene of a weight comprising 2 to 3 pounds per ream of the paper, and at high speed, for example, of 1,000–1200 feet per minute, the aforementioned coating having an extremely high degree of adhesion comprising fiber-pulling adhesion which is sufficient to destroy such fibers when delaminated.

The invention also provides a novel method and apparatus for coating paper of such known types as may have alternate compressed and uncompressed portions and relatively high stretch characteristics allowing two-way stretch to a degree not heretofore attained. The invention comprising the present method and the apparatus thereof is capable of coating such types of paper wherein a high degree of fiber-pulling adhesion is attained with coatings of extremely low weight over all areas thereof, including both the compressed and relatively uncompressed areas.

A further object of the invention is to provide a novel article comprising a porous substrate coated with a plastic film which has heretofore unattained moisture barrier qualities, bearing in mind the extreme thinness of the coating and the irregularities of the porous substrate.

The invention, in another form thereof, comprises the method of manufacturing a porous substrate bearing a coating of thermoplastic, which method consists in: extruding the thermoplastic through an orifice of preselected dimension in sheet form by the application of heat and pressure while passing the substrate adjacent the extrusion station in an attitude relative to that of the extruded thermoplastic whereby the latter is applied to the substrate, the thermoplastic having a hot stretch gap between the point of extrusion and the point of application to the substrate of the order of ¼ inch up to 7 inches, and further while applying a vacuum beneath said substrate in the region of the application to the substrate of the extruded heated thermoplastic film; and thereafter removing the heat from the aforementioned coated substrate after it passes the last-mentioned station.

The above and further objects and novel features of the invention will more fully appear below from the description thereof when the same is read in connection with the accompanying drawings which are submitted for purposes of illustration only, it being understood that such drawings do not define the limits of the invention, reference for this latter purpose being had to the appended claims.

In the drawings:

FIG. 1 comprises a schematic representation in side elevation of one form of apparatus embodying the invention and capable of carrying out one form of a method embodying the invention;

FIG. 2 is a cross-sectional view on a substantially enlarged scale of a porous substrate coated in accordance with the prior art;

FIG. 3 is a cross-sectional view also on a substantially enlarged scale showing a porous substrate bearing a plastic coating which has been applied by the present invention;

FIG. 4 is a further schematic representation in side elevation of portions of the apparatus shown in FIG. 1 but with slight modifications thereof, and with the extruding device disposed at a somewhat different attitude than in the form shown in FIG. 1;

FIG. 5 is a side elevation, partly in section and with parts broken away, of a modified form of suction roll which can be employed in the embodiment of FIG. 1;

FIG. 6 is a fragmentary view on an enlarged scale in cross-section taken along the lips of an extruding device showing the extrusion orifice and illustrating "draw" or taper of the extruded plastic film after it leaves the extrusion orifice;

FIG. 7 is a plan view of the extrusion die shown in FIG. 6 and showing the extruded film emanating therefrom and illustrating what is termed "neck-in," that is, a decrease which occurs in the width of the extruded plastic film shortly after it is extruded from the die;

FIG. 8 is a schematic representation in side elevation of apparatus embodying a second form of the invention which is somewhat similar to that shown in FIG. 1 with the exception that in lieu of a rotating suction roll there is employed a stationary suction chamber over which there is moved a carrier screen, it being understood that this form of the invention is not limited to such screen, particularly where the substrate has sufficient strength to be pulled across a stationary suction chamber;

FIG. 9 is a plan view of the apparatus shown in FIG. 8;

FIG. 10 is a side elevation, partly in section and with parts broken away, of a stationary suction box and extruder which may be substituted in the form of the invention shown in FIG. 8, and which illustrates a modification of the suction box for the purpose of effecting preevacuation, that is, for exerting suction or vacuum upon the porous substrate prior to the location where the extruded film is applied;

FIG. 11 is a schematic view in side elevation, partly in section and with parts broken away, and with parts omitted for clarity, showing another form of apparatus which may be used;

FIG. 12 is a schematic view, in side elevation, of portions of apparatus comprising a first modified form of that of FIG. 11;

FIG. 13 is a plan view of portions of the apparatus of FIG. 12 and showing a part of the filament covered porous substrate;

FIG. 14 is a schematic view in side elevation of portions of apparatus comprising a second modified form of that of FIG. 11;

FIG. 15 is a plan view of parts of the apparatus of FIG. 14;

FIG. 16 is a fragmentary view in cross-section on an enlarged scale of a novel product produced by the apparatus shown in FIGS. 11–15 and comprising a porous substrate to which is adhered an extruded plastic film, there being interposed between such layers a "scrim" or filament type of fabric consisting of relatively widely spaced filaments extending in one direction crossed by other filaments extending thereacross and which are nonwoven, the filaments being secured together and to the substrate by the extruded film;

FIG. 17 is a fragmentary view in cross-section, also on an enlarged scale, of an alternative type of product produced upon the apparatus of FIGS. 11–15, the product being shown in an intermediate stage of manufacture;

FIG. 18 shows the product of FIG. 13 in a later stage of manufacture;

FIG. 18a is a fragmentary cross-sectional view on an enlarged scale of a novel product embodying one form of the invention;

FIG. 18b is a further fragmentary cross-sectional view on an enlarged scale of another novel product embodying another form of the invention;

FIG. 19 comprises graphical representations of viscosity plotted against temperature for certain plastic substances which may be employed in the present invention;

FIG. 20 is a graphical representation of viscosity-temperature relationship for one type of synthetic linear polymer, for example, linear (high density) polyethylene, which can be advantageously employed in the present invention;

FIG. 21 is a graphical representation showing the viscosity-temperature relationship for a nylon which can be advantageously employed in the present invention, and showing the approximate processing temperature range therefor; and FIG. 22 is a graphical representation of moisture-vapor transmission characteristics of several samples of kraft paper coated in accordance with and embodying the present invention as compared to other samples of kraft paper coated by and embodying the prior art.

The method employed herein for designating the weight of a coating in pounds is as follows: The basic area is that of a ream of paper which comprises 3,000 square feet. Thus a 5 pound coating, as referred to herein, means 5 pounds of coating material per ream or per 3,000 square feet. 14.4 pounds of .920 density polyethylene for 3,000 square feet will produce a coating thickness of 1 mil. The present invention comprises, inter alia, the method and apparatus for applying extremely light coatings down to 2 pounds per ream on porous substrates, and also comprises the product or article comprising the laminate.

Referring to the drawings in greater detail, with particular reference to FIGS. 1, 2 and 3, there will now be described the first apparatus embodiment of the invention which is capable of carrying out on a successful commercial scale one form of the extrusion coating method embodying the present invention and which provides substantial economic and product quality advantages as compared to the prior art.

The apparatus of FIG. 1 is capable of producing the product shown in FIG. 3, the latter being illustrated in comparison to the prior art product shown in FIG. 2. The apparatus of FIG. 1 and the method which it can carry out is capable of coating speeds of, for example, of the order of 500 to 1500 feet per minute and still obtain "fiber-pulling adhesion" of the laminate, the weight of the coating being as low as 2 pounds per ream. A typical example of the coating substance is polyethylene deposited on, for example, 40 pound natural kraft. The apparatus of FIG. 1 also is capable of producing a laminate having fiber-pulling adhesion, the coating weight being, for example, 5 pounds per ream of polyethylene coating on 40 pound extensible paper at a coating speed of, for example, of the order of 500 to 1000 feet per minute. However, the invention is not limited to the above speeds, these being recited to indicate that, despite the very low coating weight, high adhesion, and other advantages, a high production rate is reached, such not being heretofore attainable along with such advantages.

The coating apparatus of FIG. 1 is generally designated 20 and includes a shaft 21 for supporting an unwind paper roll 22, and a shaft 23 for supporting a rewind coated paper roll 24. Interposed between the unwind and rewind rolls is the extruding and coating apparatus embracing a rotating suction roll 25, an extruder 26 for the plastic film, a chill roll or water-cooled roll 27, and heating means 27a. The invention is not limited to such heating means 27a which is employed where circumstances make it desirable.

The suction roll 25, in the form shown, comprises a rotating cylindrical rim member 28 within which there is located a stationary suction chamber 29 having a mouth 30 which is presented to the inside of such rotating suction rim member 28, the suction chamber 29 being in communication with a vacuum pump 31 via a conduit 32. It is understood that in this embodiment the suction roll 25 is generally of cylindrical conformation. Hence the suction ring or rim 28 is of similar conformation and is provided with suitable openings or pores through which the suction or vacuum can be exerted upon the porous substrate which is moved over such rotating suction roll 25.

The relatively stationary suction chamber 29 is shown in FIG. 1 as being of fixed conformation wherein the mouth 30 is of a fixed dimension. However, in lieu of this a suction chamber may be employed which is of variable dimension wherein the size of the mouth 30 may be enlarged or contracted. For example, the suction chamber 29 may be provided with sides 29a and 29b which may be in the relative positions shown in FIG. 1 or alternatively may be moved closer or spread apart. For example, the side 29a may be angularly shifted so that it assumes the angular position shown by the dotted line 29c, thereby enlarging the area which is subjected to the vacuum and accomplishing what is referred to herein as pre-evacuation, that is, evacuation of or subjecting to a vacuum a selected area of the porous substrate prior to the station or line whereupon the plastic film first contacts the substrate. In the form shown in FIG. 1 it will be seen that the plastic film which is extruded from die 33 of the extruder 26 is applied substantially in a line comprising the intersection of a horizontal plane passing through the center of the suction roll 25 and thus there is a small area between the side 29a and such film applying line which is subjected to a vacuum by the chamber 29. Thus a pre-evacuation is accomplished. The size of this pre-evacuation area may be adjusted by adjusting the relative positions of the slides 29a and 29b and in particular by adjusting the position of the side 29a relative to a horizontal plane passing through the suction roll 25.

Referring to the extruder 26, the latter embraces the aforementioned die 33 having extrusion lips 34.

The heaters 27a, in the form shown, comprises means for applying additional radiant heat to the extruded film of the hot stretch gap 35 when needed, as aforementioned. The "hot stretch gap" 35 comprises the portion of the extruded hot film between the orifice of the die 33 and the line where the film first contacts the moving substrate. In the form shown in FIG. 1, as aforementioned, this line comprises the intersection of the paper or porous substrate substantially along a plane which is horizontal and which passes through the center of the suction roll 25.

The heaters 27a may be used to influence the viscosity and adhesion of the plastic film in a manner to be explained more fully hereinafter. The invention is, of course, not limited to the use of such heaters, nevertheless under certain conditions they are desirable. In addition to the aforementioned heaters 27a, other heating means may be employed for preheating the porous substrate. One example of such means are shown in FIG. 1 comprising a preheater roll 36 over which the porous substrate 37 can be passed prior to reaching the suction roll 25.

As shown in FIG. 1, the uncoated porous substrate is designated by the numeral 37 and comprises the web which is unwound from the roll 22. Such web 37, as shown, passes over idler rolls 38 and 39 prior to reaching the rotating suction roll 25. However, the web 37, as shown by the representation thereof in broken lines, can be passed over the preheater roll 36. In lieu of the heater roll 36, any other suitable means for applying heat to the web may be employed, for example, radiant heating means.

Thus two of the variants or parameters, which may be adjusted in order to achieve the results of this invention, are the extent of the aforementioned preheat of the porous substrate by the hot roll 36 and the extent of the post-heat accomplished by the heaters 27a, it being understood that the latter are able to ecect the post-heat by virtue of the fact that they apply heat to the substrate after it is coated and in this case in addition to that applied simultaneously to the film while it is being extruded.

Two further variants or parameters which are subject to adjustment and which are carefully controlled in the present invention comprise the aforementioned pre-evacuation and also post-evacuation, the differentiation between these terms being found in the fact that the pre-evacuation refers to evacuation of the underside of the porous substrate prior to the coating line or station and post-evacuation refers to evacuation thereof after such line or position.

The water-cooled roll 27, as shown in FIG. 1, for example, is provided with an inlet conduit 40 and an outlet conduit 41 for the coolant.

There also may be employed with the embodiment of FIG. 1 an edge trimmer 42 although this is not necessary in certain forms of the invention, particularly in those forms wherein the degree of edge beading is so low that it is not necessary to trim the edges. It is possible in certain forms of the invention, to be set forth more fully hereinafter, to provide a selvage edge which may be trimmed off or in some instances to eliminate such selvage edge and to deposit the coating in such a way that there is no edge beading and no uncoated margins on opposite sides thereof and thereby eliminate the need for trimming the edge. This has the substantial advantage of substantially reducing the extent of scrap and reducing the cost of the carrying out of the novel method herein. It is also possible to extend the plastic film beyond the edges of the porous substrate if desired.

Reference is particularly made to the relative positions of the extrusion head or die 33 and the suction roll 25 for the purpose of obtaining a low hot stretch gap 35. Such relative positions produce in FIG. 1 a low hot stretch gap of the order of ½ inch up to 1½ inches, and in certain forms of the invention this is a critical factor having to do with control of heat loss in the plastic between the time that it is extruded and the time of application to the porous substrate and immediately thereafter while being subject to the vacuum of the chamber 29. By virtue of lower extrusion temperatures employable in certain forms of the present invention, it is possible to eliminate the long stretch gaps of the prior art and particularly to eliminate the hot stretch gap heretofore employed between an extrusion die and a nip roll or a pair of nip rolls, one of which is cooled. It will be observed in the present invention that the action of a cooling roll does not occur until considerably after the exertion of suction upon the underside of the porous substrate while the substrate is still hot either by virtue of heat provided by the hot die 33 or by virtue of heaters such as 27a. Thus because of a lower extrusion temperature, there is minimized oxidation and thermal degradation of the resin or plastic where such oxidation is not desired. However, in other forms of the invention, oxidation of the plastic is invoked to produce a chemical action which will improve adhesion between the layers of the laminate under conditions to be set forth hereinafter.

By controlling the amount of heat applied to the plastic extruded from the die 33, for example, heat applied to the hot stretch gap 35, and by controlling the degree of suction in the suction chamber 29, it is possible to control the extent to which the hot plastic is drawn into the surface voids or interstices of the porous substrate. Note that the heat applied to the hot resin or plastic is a function of the heat applied thereto in the die 33 and also by the heaters 27a.

Furthermore, the present invention embraces novel means, as aforementioned, for preventing heavy edge beads caused by neck-in, reference being had particularly to FIG. 7 for this purpose illustrating the neck-in of an extruded plastic film. Such neck-in of the plastic film normally occurs between the lips of the extrusion die and the point where it contacts the substrate. Such novel means embraces the means for accomplishing the aforementioned low hot stretch gap, and also embraces the suction roll 25 which is of relatively small diameter. This advantage is further enhanced by drawing the plastic film or extruding same parallel to the lands on the lips of the extrusion die. The plastic film should not be caused to change direction abruptly over the edge of either lip of the die in such a way that it scrapes against an edge thereof because any nicks or residual resin there will create streaks and voids in the extruded film.

By placing the heaters 27a over the hot stretch area embraced by the low hot stretch gap 35, it is possible to minimize the heat lost in the film. The extent of heat applied to the hot stretch area is selected so that it is possible to reduce the edge beading sufficiently to eliminate the need for trimming the edges of the coated substrate. This permits the production of plastic coated paper, for example, coated by polyethylene, having selvage (uncoated) edges. Normally, the application of heat to the hot stretch area 35 would not help the neck-in or edge beading problems which usually are aggravated by increasing both the resin temperature and the hot stretch distance. However, as aforementioned, the hot stretch distance or gap is reduced to a minimum value, in this form of the invention, and the amount of heat applied by such heaters 27a is also reduced to a minimum value in such a way that the neck beading is in fact reduced, such application of heat being selected having due regard for the chemical properties of the extruded plastic.

Manufacturers of laminates have long been desirous of producing a kraft paper coated with a plastic, preferably polyethylene, which, because of low cost, would be capable of competing successfully with paper asphalt laminates and for the purpose inter alia of providing moisture-barrier material in large volume packaging applications.

A typical example of a plastic coated paper which would be able successfully to compete with such asphalt laminate is a 40 pound natural kraft bearing a coating of polyethylene in weight not in excess of 6 pounds per ream.

Serious production problems have been encountered in an effort to achieve this result. That is, serious production problems have been encountered in producing a satisfactory product with such a lightweight polyethylene coating. The major problems encountered have to do with: (a) the obtaining of adequate adhesion of the polyethylene coating to the paper substrate, (b) the minimizing of fiber penetration into the plastic, including the minimizing of pinholes in such lightweight films, and (c) the attaining of an adequate coating speed which will make the method and product commercially feasible.

All of the aforementioned problems are encountered in the prior art including particularly the conventional pressure-chill roll extrusion coating apparatus and methods, and also in the prior art methods which have employed vacuum extrusion techniques. These have been incapable of applying a coating of this nature, for example, polyethylene of thickness equivalent to 6 pounds per ream or less on such a substrate at a commercial speed or any speed and with adequate adhesion.

The extrusion of the hot plastic film onto the moving porous substrate immediately adjacent a suction chamber, with the suction roll and the extrusion die in the relative positions shown in FIG. 1, whereby the hot plastic is drawn down around the paper fibers and into the surface voids of the substrate (thereby producing the article shown in FIG. 3) and further employing the techniques set forth above in connection with FIG. 1, have accomplished these desired results.

For example, the lips of the extrusion die, as in FIGS. 1 and 4, are positioned ⅜ inch above the suction roll, which in this case is approximately 18 inches in diameter. This provides a hot stretch distance or gap of approximately 1½ inches between the die and the substrate which is carried on the suction roll.

The apparatus of FIG. 1 has been operated at high commercial coating speeds applying coating in weights ranging from approximately 2 to 35 pounds per ream on 40 pound natural kraft paper.

In the above operation Du Pont polyethylene resin known as Alathon 16 has been used.

The results attained by the apparatus of FIG. 1 are briefly as follows:

(1) A laminate was produced wherein the plastic film is adhered to the porous substrate with fiber-pulling adhesion and this is obtained with coating weights as low as 2 pounds of polyethylene per ream on 40 pound natural kraft paper, as aforementioned.

(2) A suction equivalent to as little as 1½ inches of mercury has been sufficient to obtain the aforementioned fiber-pulling adhesion with a coating weight of 2 pounds of polyethylene (and above) per ream on 40 pound natural kraft paper.

(3) Moisture-vapor transmission tests of the product of this apparatus indicate that it is substantially superior to comparable products coated by the prior art as will be set forth more fully hereinafter in connection with FIG. 22.

The basic principle involved in the present invention comprises the extrusion coating of a synthetic linear polymer such as polyethylene on a porous substrate, such as paper, which is subjected to a vacuum wherein there is a forcing of the hot low viscosity plastic into the surface voids around the paper fibers. The conventional techniques of the prior art comprising the use of pressure nip rolls embraces the use of a rubber covered roll and a water-cooled metal roll and between which is passed both the hot extruded film and the paper. To eliminate the problem of sticking to the roll surfaces, the hot plastic surface must contact the water-cooled metal roll. Although cooling of the plastic film is initiated the instant it departs from the lips of the extrusion die, very rapid cooling occurs at the aforementioned pressure nip where it contacts the chill roll at the same time that it is forced into the surface voids of the substrate thereby producing the article of FIG. 2 which is representative of the prior art. This decreases the film thickness and significantly increases the rate at which the film is cooled. With very lightweight film, this cooling is so rapid that the plastic becomes too thick and viscous to be forced into the surface voids and little or no adhesion or at least very unsatisfactory adhesion can be obtained by such lightweight coatings which are subject to this disadvantage.

Furthermore, the tendency of the plastic to adhere to the chill roll of the prior art also promotes delamination of the lightweight coating as the laminate leaves the chill roll. Also, referring again to FIG. 2, when using a pressure roll to force the hot plastic down into the voids around the paper fibers, a smooth top surface is obtained. Thus non-uniformity in the coating thickness and protruding paper fibers occur, the latter being forced into and occasionally through the plastic film. This produces a non-uniform film over the paper surface and the film is defective in protection because of pinholes or such protruding fibers. The protruding paper fibers embedded in the plastic film also serve as wicks which tend to draw moisture or vapors through the thin portions of the plastic coating above them. Reference is made for this purpose to the dimensions 43 and 44 of FIG. 2 which indicates the extremely thin or shallow quality of the coating 45 over the high parts of the porous substrate 46 or paper. Also, the dimension 47 is further representative of the very substantial disadvantages of the coatings of the prior art. There is represented by the numeral 46a a protruding fiber which protrudes from a high portion 48 from which there is measured the aforementioned dimension 47.

Referring to FIG. 3 again, it will be seen that the present invention comprising the apparatus and method described in connection with FIG. 1 produces the novel article of FIG. 3 which provides a film 49 of uniform thickness over the relatively rough paper surface because the film by action of the vacuum from the opposite side is drawn down around the paper fibers rather than being forced down on top of them as by the prior art techniques embodying the aforementioned pressure nip rolls. It will be seen in FIG. 3 that regardless of the irregularities, the highs and the lows of the porous substrates 46, the thickness of the plastic coating 49 is substantially uniform. Such thickness of the coating 49 is indicated by the dimension 50 which is substantially constant throughout the area of the substrate.

A further and worthwhile advantage of the present invention is that protruding paper fibers, which in the prior art could partially or fully penetrate the plastic film, as 46a (FIG. 2), are drawn down against the paper surface by the action of suction, e.g., within the suction chamber 29, and this is accomplished before the plastic film contacts the substrate. Hence the article of FIG. 3 is not subject to the very serious disadvantage comprising such a protruding fiber 46a.

Thus the method and apparatus of FIG. 1 provide a vacuum extrusion coating technique which yields a superior laminate product which possesses fiber-pulling adhesion of the plastic film coating even for the most lightweight coating heretofore achieved and this with improved moisture-barrier properties at comparable or lighter coating weights. These factors, plus a substantially lessened edge trim scrap, provide significant advantages over the prior art. Furthermore, coating speeds are attained which are comparable to or higher than those attained by the prior art. Furthermore, the present apparatus is capable of attaining coating weights above 2 pounds per ream and for use with other substrates having porosities of the order of that of 40 pound natural kraft.

Referring to FIG. 5, there is shown a suction roll 51 embracing a rotating perforated cylinder 52 and a vacuum chamber 53, the latter being defined by sides 54 and 55 which may be angularly shifted with respect to each other in a manner somewhat similar to the angularly shiftable sides 29a and 29b of FIG. 1.

Referring to FIG. 6, there is shown on an enlarged scale a fragmentary view of opposed lips 56 and 56a of the extrusion die 33 of FIG. 1, there being represented in FIG. 6 the extent of "draw" or taper of the extruded film. In the form shown, the distance between the lips 56 and 56a of the extrusion die is .020 inch and the film thus immediately at the outer edges of such lips is of an equal dimension but tapers down to a dimension of .001 inch within the dimension 57.

Referring now to FIG. 7, the lips 56 and 56a of the die 33 of FIG. 6 are shown in top plan view and the plastic film 35 is shown being extruded therefrom. The extent of "neck-in" is represented by the dimension 58 which occurs on one side of the film, it being understood that an equal amount of "neck-in" occurs on the opposite side. Thus the total reduction in the width of the extruded plastic film amounts to twice the dimension 58.

Referring now to FIG. 8, there will be described a further embodiment of the apparatus and method for producing the novel article as shown in FIG. 3, the principal distinction between the embodiment of FIG. 8 and that of FIG. 1 comprising broadly the employment of a considerably larger and stationary suction chamber or chambers over which there is moved a carrier screen in lieu of a rotating perforated cylindrical roll.

The embodiment of FIG. 8 is designated generally by the numeral 59 and comprises a stationary flat pan-like suction chamber 60 over the top surface of which is moved a carrier screen 61 which may be in the form of conventional window screening, the latter being in the form of an endless band which is passed over four rollers 62 and 63, and 64, 65. The top surfaces of the rolls 62 and 63 are substantially coplanar or tangent with the plane which passes over the top of the suction chamber 60, and the rolls 64 and 65 are located in any desired convenient location for directing the endless screen band 61. The suction chamber 60 is connected to a suitable source of suction comprising a vacuum pump 66 and such suction chamber is positioned in such a way that the screen covered opening or the plane thereof is parallel to and in line with the axis of the resin flowing from a standard flat film die 67 which is analogous to the die 33 of the extruder 26 (FIG. 1). The trailing edge of the screened opening is positioned just ahead of the die lip. Thus in such vacuum extrusion coating method there is extruded the synthetic linear polymer, such as polyethylene, onto a porous substrate 68 immediately ahead of the suction chamber 60. As the plastic coated substrate moves over the suction chamber 60, the hot plastic is drawn down into the surface voids of the substrate in the manner described above.

By way of example, 40 pound natural kraft paper can comprise the porous substrate 68 and is fed through the apparatus of FIG. 8 passing just below the lips of the die 67 and thence over the suction chamber 60. The hot polyethylene extruded from the flat film die contacts the paper just before it passes over or moves over the suction chamber. By means of this apparatus, it is possible to obtain a hot stretch distance or gap of less than ½ inch between the die lips and the porous substrate.

In this form of the invention also, as in that of FIG. 1, the degree of adhesion and the coating weights are controlled by controlling the parameter or variants, for example: the extruder output; the resin or melt temperature; the extent of post-heat applied to the film, i.e., heat after extrusion; the speed of the substrate; the degree and location of suction or vacuum (presuction and postsuction); the effective suction area; and the hot stretch distance or gap. By means of this process, it is possible substantially to eliminate the hot stretch gap and thus to eliminate for all practical purposes edge beading. As a result it is not necessary to trim the edges of the product produced by the apparatus of FIG. 8.

By means of the apparatus of FIG. 8, it is possible to attain a coating speed between 500 feet per minute and 1,500 feet per minute and to produce a product wherein the plastic film attains a fiber-pulling adhesion upon the porous substrate, the weight of the coating being of the order of 2 to 3½ pounds of polyethylene per ream, the porous substrate having a porosity of the order of that of 40 pound natural kraft. However, the invention is not limited to the above speeds, the upper limit not being established.

Also, it is possible by means of the apparatus of FIG. 8 (and also FIG. 1) to produce such an article having fiber-pulling adhesion of the plastic film with a 5 pound per ream polyethylene coating on 40 pound extensible paper at a web speed up to 1000 feet per minute, the paper being of creped and embossed types.

In another form of the invention somewhat similar to that of FIG. 8, the moving carrier screen 61 is eliminated and in lieu thereof a stationary perforated cover is provided for the top or mouth of the suction chamber 60 and the porous substrate is pulled or moved thereover without the aid of the moving screen.

Such embodiment of the invention as described in the last paragraph is satisfactory for moving such porous substrates which have sufficient strength to withstand the pull required to draw same across the suction area. The major advantages of a stationary suction box over a rotating suction roll are: that it is of greater simplicity of design and thus somewhat of lower cost: further it requires somewhat less space and also there is ability to obtain a shorter hot stretch gap between the die and the substrate.

The following table illustrates, by way of example, certain conditions and results of the present invention:

*Data: Stationary Flat Suction Box*

| I | II | III | IV | V | VI | VII |
|---|---|---|---|---|---|---|
| 630 | 510 (N) | 4 | 7.5 | 3.5″ | 1.75″ | 3.5 |
| 645 | 425 (DS) | 4.5 | 7 | 4″ | 1.25″ | 5(#) |

I. Die temp., ° F.
II. Web speed, ft./min.
III. Hot stretch gap, inches.
IV. Suction (centimeters of mercury).
V. Distance suction is applied to the web before contact of coating and substrate.
VI. Distance suction is applied to the web after such contact.
VII. Polyethylene, weights in pounds per 3,000 square feet.
NOTE—
Resin: Alathon 16.
Paper: (N) 40# Natural Kraft; (DS) 40# creped and embossed.

Excellent fiber-pulling adhesion was attained in both instances above.

Referring now to FIG. 10 there is shown a somewhat modified form of stationary suction chamber designated in general by the number 69 and comprising a "pre-evacuation" region 69a and a post-evacuation region 69b.

The pre-evacuation region refers to that portion which is beneath a pre-evacuation length or dimension which exists prior to the application of the extruded film coating. This length or dimension is adjustable and is represented by the numeral 70. The length of such pre-evacuation dimension is a function of the porosity of the substrate. One of the principal reasons for employing such pre-evacuation is to prevent bubbles in the coating which otherwise might occur due to entrainment of air prior to the application of the extruded film. Also, an air layer is carried along on the surface of the web at high speed and this must be prevented from becoming interposed between the substrate and the film.

The post-evacuation region 69b refers to that beneath the suction length or dimension represented by the numeral 71, it being understood, of course, that the extent or degree of suction in either or both of said regions can be adjusted.

In the form of the suction box shown in FIG. 10, there may be employed a moving screen 72 or, if desired, the screen may be eliminated and a perforated or porous top or covering 73 may be employed.

In FIG. 10 the extruder die is designated by the numeral 74 and extrudes the hot polyethylene or other synthetic linear plastic to produce a hot stretch gap 75.

The final coating weight, of course, is a function of the speed of the web, the rate of extrusion, and the additional variants aforementioned.

Referring now to FIG. 11, any suitable known form of apparatus may be provided at 77 for delivering a fabric or scrim having filaments extending longitudinally and transversely for application to a web 79 of porous substrate, such as paper, coming from a roll 80. In case such fabric is non-woven, the transverse strands may be held in place on the longitudinal strands by prior known forms of apparatus comprising no part of the present invention and which, for example are somewhat schematically indicated as a cable 81 and a grooved belt 82 (these being duplicated at opposite sides of the fabric and portions only of same being here shown) between which the transverse strands as advanced may be gripped until released from such cable.

At a region, such as 83 (FIG. 11), where such cables and belts relinquish the transversely extending filaments, there is employed a plastic extrusion vacuum coating apparatus 84 having an extrusion head 84a, such as those shown as 74 in FIG. 10 and 67 in FIG. 8, which extrudes a plastic film 85.

Thus the apparatus 77 produces the article 78 (FIG. 11), which is unfinished in manufacture and comprises the porous substrate 79, for example, kraft, over which is laid the aforementioned bonded fabric or scrim 78 comprising the transverse and longitudinally extending filaments, and preferably (but not necessarily) before said transversely extending filaments are released by means such as the cable 81 and belts 82, there is extruded thereupon and upon the substrate 79 the plastic film 85, as shown in FIG. 11, thereby to produce the novel article 86 (FIG. 16).

Immediately the hot plastic film 85 is extruded by the extrusion head 84a, a suction chamber 86 sucks the hot film down on the porous substrate 79, over the filaments 78 and anchors same to such substrate.

It is not necessary to employ any adhesive per se, that is, a separate adhesive layer to join the substrate 79 (FIG. 16) with the filaments 78, this being accomplished by the hot sticky plastic film 85 which is sucked down over such filaments, both longitudinal and transverse, thereby anchoring same firmly to the porous substrate. However, the invention is not limited to such omission of adhesive.

The porous substrate 79 may constitute, for example, ordinary paper, such as natural kraft as aforementioned, or it may constitute the aforementioned extensible types of paper. One of the principal advantages of the present invention is that it provides a method for applying extremely lightweight coatings or coatings within a wide range of weights of plastic to the aforementioned extensible paper. Despite the variations in thickness of such papers, it is possible to obtain a high degree of adhesion over their entire area.

In the coating art a so-called 10 pound coating produces a layer of plastic approximately ¾ mil thick on the paper which is considered not to be a particularly heavy coating but rather one of medium thickness.

By means of the present invention, comparable fiber-pulling adhesion has been attained with a 5 pound per ream polyethylene coating on creped extensible paper whereas similar adhesion presently cannot be attained even with a 10 pound coating using the prior art techniques.

Thus substantial advantages are attained by the present invention in its ability to apply very lightweight coatings to such extensible paper. The present invention comprises the most effective method now known for accomplishing this result and it is presently believed that there is no other adequate method which can produce an article having comparable fiber-pulling adhesion with a lightweight coating and at high coating speeds of commercial magnitude.

The article shown in FIG. 3 which is produced by the present invention may constitute either crepe paper, other extensible paper, or natural kraft.

One of the important advantages of the present invention is that by means of it, it is possible to obtain adequate adhesion over the entire surface of the paper, that is, including both the thick and the thin cross-sectional areas even though an extremely lightweight coating is deposited. A coating down to 2 pounds per ream, as aforementioned, has been successfully applied at high commercial speed, the product comprising a laminate wherein the laminae must be destroyed in order to separate same, i.e., fiber-pulling or fiber-locking adhesion.

Also, the invention is applicable to any porous substrate through which a vacuum can be exerted upon a film. Thus the invention is not limited to the employment of paper although advantageous and desirable embodiments thereof are herein described employing same.

For example, the porous substrate can comprise textile materials or so-called non-woven fabrics, the term "bonded fabric" being employed herein as indicating a non-woven type thereof.

It is possible to use apparatus such as of FIG. 11 to produce a laminated article 87 (FIG. 17) comprising two layers of paper 88 and 89 having a scrim 90 therebetween (that is, a non-woven fabric) and to employ an adhesive 91 only on the under surface of the layer 88 of paper (as in FIG. 18) which is opposite to a suction chamber 92, that is, to employ adhesive only on the under surface of the top layer 88 of paper and to omit it from the upper surface of the bottom layer 89. The application of suction to the laminate in this form pulls together the two layers of paper with the scrim sandwiched therebetween and causes the adhesive on the upper layer to bond tightly to the paper thereagainst comprising the lower layer. Thus there can be eliminated pressure means, such as pressure nip rolls, for pressing together the laminae.

If a layer of adhesive is applied to the bottom layer of paper 89 next to the suction chamber, the suction will be effective only to draw in such layer of adhesive into the pores of such lowermost layer 89 and would be thus ineffective to urge the top layer of paper to the bottom layer.

Referring again to FIG. 16, the novel article of manufacture thereof comprises the plastic film 85, the paper web 79, there being sandwiched therebetween the longitudinal and transverse filaments of the scrim 78, which filaments are closely anchored to the base paper layer and thereby prevented from relative movement. This is accomplished despite the absence of adhesive per se applied to either one of the layers 79 or 85.

It will be noted that by means of the apparatus of FIG. 11, which produces the article of FIG. 16, there is bonded an non-porous layer 85 to a porous substrate 79, there being interposed therebetween the scrim 90 although the article is not limited to the interposition of such a scrim, it being possible to produce an article, as in FIG. 16, wherein the filaments 78 are removed and there are substituted any other non-woven web or any other fabric woven or non-woven. It is, of course, necessary that the sandwiched scrim or fabric be sufficiently porous in order to permit the sucking of the non-porous layer up against the porous one by means of the suction.

A further example of a novel article (FIG. 18a) produced by the present invention comprises a non-porous web 93 comprising, for example, aluminum foil or tin foil bonded to a porous substrate 94, such as paper, by means of the apparatus comprising the present invention. Also, if desired, any porous fabric, such as a scrim 95, may be interposed between web 93 and the porous substrate 94, as in FIG. 18b. The spacing between the filaments normally are relatively large to permit the non-porous web to be pulled closely against the porous one in between such filaments. The degree of pliability of such foil, however, must be adequate to permit such bonding to the porous substrate.

The degree of pliability of a metallic web or foil, such as aluminum foil, is low relative to the pliability of a plastic web which is extruded upon the porous substrate while hot.

Reverting again to the article of FIG. 16, a substantial improvement over the prior art is achieved by virtue of the elimination of the adhesive layer per se, and also because of the firm anchoring of the filaments of the scrim 78 to the porous substrate 79 to a degree heretofore unattainable. This is true because it is not possible to cause two layers of paper to adhere together as closely as can be achieved by a flowable plastic film or non-porous web, such as 85, which is drawn down upon a porous web, such as 79, by means of suction.

Referring now to FIGS. 12–15, there will be described two alternative apparatuses which may be employed in lieu of the apparatus of FIG. 11.

The apparatus of FIG. 12 is broadly designated by the numeral 96 and embraces an extrusion head 97, the lips of which are in such an attitude that the extrusion of the plastic takes place in a downward vertical direction whereby the extruded film 98 is directed adjacent a suction chamber 99 of a suction roll 100 which rotates upon a horizontal shaft 101. The construction of the suction roll 100 is substantially similar to that of the suction roll 25 of FIG. 1 as is the attitude of the extrusion head 97 as compared to the die 33 of FIG. 1.

The general objective in the forms of the apparatus embracing not only that of FIG. 11 but also the embodiment of FIGS. 12, 13 and also the embodiment of FIGS. 14, 15 is to apply the extruded plastic coating approximately at the region of separation of the belts and cables of scrim producing machine. However, the invention is not limited to extruding the plastic coating precisely at such region because the following exceptions exist:

(a) The extrusion of the plastic coating may take place well ahead of the separation region of such belts and cables and there may be a trimming off of the edges of the laminate along a line inside the opposite pairs of belts and cables thereby permitting the belts and cables to carry off the scrap edges which have been so trimmed, and thus the separation region can be at any desired place; and (b) The extrusion of the plastic coating onto the scrim, and in turn onto the paper or other porous substrate, may be accomplished after the separation of the belts and cables in such a manner that the scrim may rest momentarily loosely on the porous substrate and the extrusion of the hot plastic coating will tend to anchor it down, this under the action of the vacuum which pulls it down while it is in the hot state and thus bonds it and the scrim to the porous substrate.

In the form of the invention shown in FIGS. 12 and 13, the extrusion of the plastic film and its contact upon the porous substrate and the scrim adjacent thereto take place substantially at the point of separation of the belts and cables of the scrim-producing machine.

Such region is generally designated 102 in FIG. 12, the coating occurring under the following circumstances:

The scrim consisting of transversely extending filaments (which are anchored or secured at or near each end between a cable and a belt which are pressed together, for example, the cable is pressed into a groove in the belt), is carried to the coating region by means of the merged cable and belt designated 103 and 104 in FIG. 12 which respectively designate the cable (103) and the belt (104) in their merged or filament-gripping condition. Also approaching the suction roll 100 and from the same direction is a porous substrate 105 which, for example, is of kraft paper. Thus the scrim carried by the merged cables and belts is brought together with a porous substrate over the top of the suction roll 100 and thence down to the coating region 102 where the belts and the cables separate on opposite sides of the scrim.

Thus at the point of separation the scrim is anchored to the porous substrate under the action of the suction which exists in the suction box or chamber 99 which exerts its influence by virtue of a porous rotating outer ring analogous to the cylindrical ring or rim 28 of FIG. 1.

The belt 104 passes substantially around 180° of the suction roll 100 and thence to the right, as viewed in FIG. 12, and the cable, instead of passing so far around the suction roll 100, passes substantially vertically downward to an idler roll 106 and thereby at the region 102 is separated from the rubber belt thereby freeing the transverse filaments of the scrim.

Referring to FIG. 13, the scrim is designated generally by the numeral 107 and comprises the longitudinally extending filaments 108 and the transversely extending filaments 109.

Of course, it is within the purview of the invention for the filaments to have any suitable attitude relative to one another, it being, of course, normal, for the transversely extending filaments to be suitably held at their opposite extremities prior to being brought together with the porous substrate. But other types of scrim-producing apparatus can be employed as will be discussed below.

After the separation region 102 is passed, the now plastic film coated scrim and substrate passes around a roll 110, which may be a chill roll, for the purpose of solidifying or setting the plastic prior to its passing to a suitable rewind roll.

Referring now to the embodiment of the apparatus of FIG. 14, the latter is somewhat similar to that of FIG. 12 with the exception that the belts and cables which secure the opposite extremities of the transversely extending filaments release such filaments at a region 111 which is well ahead of the coating region which is designated 112, the transverse filaments having their opposite extremities held in place after such release by means of a pair of endless belts 113, 113a which are so disposed that, for example, the lowermost portions of the runs thereof pass over the top portion of a suction roll 114, such runs moving in the direction of the arrows 115 and thence down over a suction chamber 116 which is positioned analogously to the chamber 99 of the suction roll 100.

Such lowermost portions of such runs of the endless belts 113 and 113a thence are directed away from the suction chamber and coating region, for example, via an idler roll 117 and thence over other suitable idler rolls, such as 118–120, inclusive.

It will be observed that the endless belts 113 and 113a in effect grip or secure the opposite extremities of the transversely extending filaments by passing over a roll 121 exactly at the region where the cables and belts of the scrim-producing machine separate and relinquish their hold upon such filaments.

Such cables and belts in the embodiments of FIG. 14 are respectively designated by the numerals 122 and 123 and are analogous respectively in function to the cables and belts 81 and 82 of FIG. 11, and 103 and 104 of FIG. 12 with the exception that the point at which they relinquish control of the transversely extending filaments is different from the embodiments of such two other figures.

The embodiment of FIG. 14 is provided with a suitable extruder 124 having an extrusion die 125 which is analogous to the die 97 of FIG. 12.

A shaft 126 (FIG. 15) is employed for supporting a plurality of coaxial consecutively situated sleeves 127 which are mounted upon the shaft 126 for the purpose of giving it a diameter exactly equal to the diameter of pulleys 128 over which pass the belts 123.

Referring to FIG. 15, the scrim is designated generally by the numeral 129 and consists of transversely extending filaments 130 and longitudinally extending filaments 131.

While it has been found advantageous to employ a scrim forming apparatus such as above referred to one may employ any other suitable known types of suitable scrim- or fabric-producing machine. Further, it is within the purview of the invention to omit the paper substrate and to apply the thermoplastic coating to the scrim alone, it becoming in effect the porous substrate. Such scrim or any fabric (woven or unwoven) can be so employed, but the spacing between the filaments must not be so great as to fail to give adequate support to the film.

The weight of the coating is, of course, a function of the density of the plastic, and as the density increases the weight of the coating per ream increases proportionately for a given thickness. In the blow molding of containers, such as bags of plastic, the extrusion temperature may vary, for example, for polyethylene it may be 375° and 425° F. However, in the case of the extrusion coating method of this invention, it has been found desirable to employ a range of temperatures between 550° to 650° F. for polyethylene, although the invention is not limited to such range, the temperature range depending on the plastic.

The reason for heating the plastic is to insure a proper adhesion of the plastic film to the porous substrate and also to insure that the material is extrudable or drawable properly through the die as a continous film. The extrusion characteristics of the substance must be considered in selecting the temperature of the plastic which is being extruded and if the temperature is too high, the plastic substance becomes liquid and does not draw properly through the die and does not attain a proper draw or taper thereafter. The maximum temperature must not exceed the decomposition temperature. On the other hand, if the temperature is too low, the plastic cannot be extruded at all or it cannot be extruded at a speed which is commercially feasible for the coating of the paper. Consequently, there is a critical temperature range at which extrusion must be made and normally the best extrusion temperature is relatively low for a good "draw" or taper characteristic and this relatively low temperature is one that is selected with reference to the extrusion characteristics of the substance.

The viscosity curve of some substances, such as conventional and linear polyethylene, polypropylene and nylon (polyamide) are of differing slopes as illustrated by the graph of FIG. 19 which shows, for example, the slope of the polyethylene viscosity-temperature curve 132 to to be of considerably lower value than that of the example plastic at the opposite end of the scale, in this case nylon, and exemplified by the curve 133. A relatively large range of temperatures, as represented by the numeral 132a, can be used and thereby attain adequate draw characteristics with respect to the polyethylene, whereas if a nylon substance is used a narrower increment or range of temperatures 133a must be observed because of the difference in the slope of the temperature curve.

The viscosity temperature curve of an intermediate substance, such as polypropylene, is designated at 134 and it has an intermediate range of temperatures 134a which must be observed in carrying out the present invention.

At high temperatures it is possible to obtain the best adhesion of the thermoplastic substance to the porous substrate but it cannot be so high that there is produced: (a) non-uniform draw characteristics; (b) resin breakdown; or (c) thermal degradation or excessive oxidation. Hence it is necessary to select and to balance these variable factors in order to obtain the desired result of adequate extrusion, speed or volume with proper "draw" or taper characteristics. It should be further borne in mind that the principal advantages to be attained by the present invention are: strong adhesion and improved barrier properties at a given coating weight and this must be done without producing the aforementioned disadvantages of (a), (b) and (c). Hence, there is a definite range of temperatures for each thermoplastic substance within which the extrusion is preferably accomplished and this range will vary from substance to substance.

In FIGS. 20 and 21 there are shown typical ranges of such extrusion temperatures for certain substances.

Referring now to FIG. 22 and to the table set forth below, there will now be discussed the moisture vapor transmission advantages of the laminates of the present invention as compared to the laminates of the prior art, there being employed as a coating a synthetic linear polymer, for example, polyethylene, including several examples of this polymer of differing density, namely, low, medium and high.

| Density | Process | Moisture Vapor Transmission (gms./100 in.²/24 hrs. at 100° F. 90% R.H.) | | | | |
|---|---|---|---|---|---|---|
| | | Coating Weight (lb./ream) | | | | |
| | | 5 | 7 | 10 | 15 | 20 |
| .918 [1] | Prior Art | | 3.2 | 2.2 | 1.3 | 0.9 |
| .923 | do | | 2.85 | 2.0 | 1.2 | 0.85 |
| .924 [1] | do | | 2.6 | 1.7 | 1.0 | 0.8 |
| .923 | Present Invention | 2.7 | 2.1 | 1.35 | 0.9 | |
| .930 [1] | Prior Art | | 2.2 | 1.4 | 0.9 | 0.7 |
| .930 | Present Invention | | 1.7 | 1.1 | 0.75 | 0.6 |
| .950 [1] | Prior Art | | 1.7 | 1.0 | 0.6 | 0.5 |
| .950 | Present Invention | | 1.8 | 0.75 | 0.5 | 0.4 |

[1] Polyethylene coatings applied to 18 lb. unbleached kraft.

In the graphical representation of FIG. 22, the several curves illustrate the moisture vapor transmission characteristics of the several laminates coated with the polyethylenes of the several densities as plotted against coating weight in pounds per ream. The moisture vapor transmission characteristics are measured in grams per 100 sq. in. per 24 hours, the temperature being 100° F. and the relative humidity 90%.

Referring to the curve 135, this curve represents the moisture vapor transmission characteristics for a low density polyethylene (.923 Alathon 16) which is applied by the present invention and such are comparable to the moisture vapor transmission characteristics obtained by a medium density polyethylene (.930 DHDA–6386—Union Carbide) which is applied by the method and apparatus of the prior art and represented by the curve 136.

Thus the low density polyethylene coating applied by and embodying the present invention is capable of performing substantially as well as the considerably heavier medium density polyethylene coating aforementioned.

Referring now to the curve 137, it will be observed that this curve represents the moisture vapor transmission properties of a medium density polyethylene coating (.930 DHDA–6386—Union Carbide) as applied by and embodying the present invention. The curve 137 should be compared with the curve 138 which represents the moisture vapor transmission properties of a high density polyethylene (.950 DGDD–7401—Union Carbide) as applied by conventional or prior art methods. At least in the 7 to 10 pound per ream range, that is, in the range of the coating weight of 7–10 pounds, it will be observed that the moisture vapor transmission properties of the medium density polyethylene coating applied in accordance with the present invention provides moisture vapor transmission protection which is closely similar to and advantageously comparable with those of the high density resin of the curve 138.

The curve 139 represents the moisture vapor transmission characteristics of a high density coating applied by the present invention, the high density being designated as follows: .950 DGDD–7401—Union Carbide. In comparing the moisture vapor transmission properties of the curve 139 with those of the curve 138, it is clear that the former is significantly superior to that obtained by the conventional method.

Referring now to the point 135a of the curve 135 which represents the moisture vapor transmission properties of the coating applied by the present invention, and also referring to a point 140a at the peak to the curve 140, the latter representing the moisture vapor transmission characteristics of a conventionally applied coating, it will be seen that the moisture vapor transmission characteristics of the 5 pound low density coating applied by the preesnt invention is substantially superior to the moisture vapor transmission characteristics of a 7 pound coating at 140a applied by a conventional method.

Accordingly, although employing low density polyethylene resins, such as the .923 Alathon resin aforementioned, and applying same in accordance with and by the present invention, there is attained the high fiber-pulling adhesion required yet it was possible to obtain comparable moisture vapor transmission barrier properties at 2 pounds per ream lower coating weights.

Accordingly, where a typical resin presently costs $.325 per pound at a density of .930 and lower, the resin cost by employing the present invention is reduced by $.65 per ream, that is, per 3000 sq. ft.

Referring to the point 137a on the curve 137, aforementioned, it will be noted that its moisture vapor transmission characteristics are measured on the scale at the left of FIG. 22 by the numeral 1.75 approximately. The point 137a is for a 7 pound per ream medium density coating applied in accordance with the present invention, and this point 137a should be compared with a point of the same moisture vapor transmission characteristics 140b of the curve 140, which represents approximately 12 pounds per ream of low density (.923) coating applied by the conventional method of the prior art.

Thus the points 137a and 140b establish that a 7 pound coating applied by the present invention provides moisture vapor transmission protection comparable or equal to an approximately 12 pounds per ream low density coating applied by the prior art. The cost saving in resin represented by the aforementioned comparison is quite substantial.

Referring now to those other forms of the invention which are considered non-analogous and which have to do with the employment of longer hot stretch distances or gaps, with respect to certain types of substrates, the bonding action between the substrate and the polymer is sometimes dependent on oxidation of the plastic film and under such conditions a longer hot stretch distance may be desired. Such longer hot stretch gap refers to gaps up to 7 or 8 inches. By way of comparison, with the equipment as shown in the present application, it is difficult to reduce the hot stretch gap to much less than 1½ inches which is substantially the shortest gap attainable.

This is significant in view of the following: Regarding cellophane or aluminum foil or the like, the adhering or locking action is not a mechanical one with respect to polyethylene. There are two smooth surfaces and an oxidation of the polyethylene film may be required to provide the desired degree of adhesion. Consequently, the hot stretch gap may be, for example, 4½ inches or even up to 7 or 8 inches for the purpose of providing adequate oxidation of the plastic film to attain the desired adhesion by a chemical bond. Note, however, that in this last instance the substrate is not normally a porous one unless made so as by minute perforations caused, for example, by high voltage arc.

However, where a bonded fabric, such as a scrim is employed, the filaments per se may be non-porous and they may be saturated with a bond enhancing compound, such as a cellulosic one, for example, cellulose acetate or cellulose nitrate or the like, in which event the hot stretch gap could advantageously be increased to provide somewhat enhanced oxidation in order to attain a better adhesion between the bonded fabric or filaments of the scrim and the extruded plastic. In such instance, there would not be a complete reliance on a mechanical wrapping action of the plastic film around the filaments but rather advantage would be taken of the chemical bonding as well.

Thus if the porous substrate is saturated with a suitable bond enhancing liquid, such as that aforementioned, then the fibers of the porous substrate may be saturated by the liquid and although it may still be porous, it is considerably less porous than without such liquid. Consequently, the mechanical locking action of the hot plastic may be reduced and greater reliance placed upon the chemical bonding action aforementioned which is facilitated by the oxidation of the plastic.

The use of such liquid has the effect of providing a barrier between each such filament or fiber and the plastic film extruded thereon and hence it is desirable to employ some degree of oxidation in certain instances to insure a satisfactory bond by chemical action of the oxidation of the saturant.

Many such liquid saturants are non-polar. Polyethylene, for example, is considered chemically a non-polar material. This is one reason why it cannot be printed upon and attain adequate ink adhesion. Thus it is first treated by suitable oxidation processes which oxidize the surface and transform it to one of polar characteristics. Analogously, the hot stretch gap may be increased from its low value 1½ inches, as aforementioned, to one of larger magnitude in order to enhance the oxidation and polar characteristics of its surface. There is thus provided more time for an oxygen bond thereby to allow oxygen molecules or atoms to react with the unsaturated polyethylene linkages to bond onto it and to make it a polar surface whereby it will adhere to such other materials to a greater degree. Consequently, there is created such chemical bond or adhesion which supplements the mechanical locking or wrapping action.

Note that the aforementioned oxidation of the hot stretch gap is only for certain substrates which require it and where oxidation is sought to said adhesion. This may be done, as aforementioned, by increasing the hot stretch gap and is employed in separate and non-analogous embodiments of the invention as compared to those initially mentioned wherein a small hot stretch distance is employed.

In conventional procedures heretofore employed wherein the chill roll and a rubber covered press roll are employed to produce a nip or gap, the effect of the chill roll is to remove heat from the hot plastic, and as such heat is removed the adhesive qualities diminish of the hot plastic extruded film. With relatively thick plastic films, the ability of the chill roll to remove heat is considerably less than with the very thin coatings. When the extruded plastic film is passed between the chill roll and the rubber roll and it is of very small thickness, the degree of heat removed is sufficiently great to produce a laminate of low adhesion which can be desirable in some instances.

The temperature of the plastic at the extrusion lip may be, for example, 600° F. and the hot stretch gap may be, for example, 3 inches. The temperature of the film at the point of application may be say 500° or 525°.

The side of the extruded plastic film which is to be engaged with the porous substrate can advantageously be oxidized to improve the bond chemically whereas in some forms of the invention it may not be desired to oxidize the other side of such film because, for example, it militates against or prevents forming a good heat seal. Accordingly, suitable means, such as a vacuum, may be applied to one side of the plastic film to minimize or prevent the oxidation of such side for the above purpose.

The amount of vacuum or suction which is required in the present invention is a function of the porosity of the substrate. If the substrate, for example, is a 70 pound liner board, a high degree of suction is required to adhere the plastic satisfactorily and to pull it down to achieve a desired bond, whereas if the substrate is a light tissue paper, the degree of suction required is much less. The limits of the thickness of the film which can be applied by the present invention normally vary between 0.10 mil up to 10 mils, although thicker films can be applied.

Regarding the use of polypropylene: This substance can be extruded at a somewhat lower temperature than the 600° F. employed for polyethylene as aforementioned, for example, an extrusion temperature of around 500° F. can be employed. When polypropylene is extruded at this temperature onto the porous substrate with the aid of the vacuum on the underside, there will be effected a bond although it will be a relatively weak bond and the plastic film can be easily peeled off. The vacuum, however, assists in forming the bond and in effecting a mechanical locking but in the absence of the vacuum, there can still be accomplished a slight sticking of the film to the porous substrate. Such weak adhesion can be later perfected by the application of heat, this comprising a further form of the invention. Thus the porous substrate can be passed with the film thus weakly tacked or adhered to it into a secondary or downstream vacuum station where it can be subjected to further heat by secondary heating means. The combined action of the vacuum at such secondary vacuum station and the heat will improve the weak bond.

By means of the present invention, there may be attained a range of differing degrees of adhesion of the plastic and the porous substrate between the fiber-pulling adhesion down to a merely light adhesion. Even though a low degree of adhesion is attained between the laminae of the product, the latter has superior moisture vapor characteristics.

Furthermore, the much lighter coating which can be achieved by the present invention attains the same moisture vapor transmission protection as the heavier coatings of the prior art, and such lighter coatings can achieve a very much wider range of degrees of adhesion, plus a much wider range of weights of coating, than the prior art. But a most important advantage is that by means of the present invention a laminate is produced by which there can be attained the same moisture vapor transmission properties with much less plastic than heretofore.

The following are examples of such thermoplastic substances and their heat-sealing temperatures:

(a) Conventional polyethylene—212° F.;
(b) Linear polyethylene—245° F.;
(c) Polypropylene—310° F.;
(d) Nylon—400° F.

Such heat-sealing temperatures are significant because they indicate the behavior of these thermoplastic substances during and after extrusion and have a significant effect upon the degree of adhesion to the porous substrate. For example, conventional polyethylene which has a heat-sealing temperature of 212° F. can be extruded advantageously at a range in the neighborhood of 580°–640° F. and because of the spread between such extrusion range (580°–640° F.) and such heat-sealing temperature (212° F.), it will not prematurely harden or congeal and thereby have a detrimental effect upon the bonding thereof to the paper or other porous substrate. That is, the conventional polyethylene with this particular spread between extrusion and heat-sealing temperatures will permit the action of the suction to accomplish a firm bond prior to the time that the plastic hardens.

On the other hand, the nylon illustrates the condition on the other side of the scale, namely, a substance which has a relatively much higher heat-sealing temperature and hence a narrower spread between it and the extrusion temperature range.

In the absence of post-heating above referred to, there are presented certain problems of adhesion of the thermoplastic film to the porous substrate with respect to thermoplastics typified by nylon because thermoplastics having its characteristics will set up, or harden, or congeal prematurely and the action of the vacuum or suction upon such thermoplastic through the porous substrate will not be able to effect a suitable adhesion otherwise. Preheating the substrate significantly improves adhesion, particularly at low coating weight and with plastics which set up at relatively high temperatures. Thus with certain classes of thermoplastic substances typified by such nylon, where the heat-sealing temperature is relatively high as compared to the extrusion temperature, and hence where there is a relatively narrow spread between these two temperatures, it is proposed to employ the aforementioned post-heating, namely, the application of heat to the coating after it has been applied to the porous substrate. This is done inter alia for the purpose of maintaining or developing a sufficiently low viscosity of the coating substance to permit the suction to effect a suitable adhesion.

The aforementioned adhesion problem of substances typified by nylon is accentuated and is in fact brought about by the thinness of the coating. For relatively heavy coatings, the thermoplastic substance is able to hold its heat adequately in many instances so that such post-heating is not necessary. However, for the very light coatings, particularly for the aforementioned nylon where the thickness of the coating will not permit of the holding of the heat to an adequate extent to attain satisfactory adhesion, it becomes necessary to resort to the post-heating of the coating, this being done while the porous substrate and the coating pass over the suction region comprising, for example, the vacuum box or rotating vacuum roll.

The problem of ensuring adequate adhesion of substances of this class, such as the aforementioned nylon, can be at least partially solved by employing preheating of the porous substrate described above in connection with FIG. 1 in order that the porous substrate be of suitable high temperature to aid in maintaining the viscosity of the film to reduce the heat loss of the film to achieve adequate adhesion under the action of the suction.

Reverting to the web speed, it is possible to achieve a coating speed in excess of 1,200 feet per minute by properly selecting the polymer, the speed of the drive motor for the several rolls, and by properly adjusting or selecting the various other factors, including: the temperature of extrusion (or temperature range thereof), the length of the hot draw or stretch gap, the extent of pre-heating, and post-heating, and the extent of pre-evacuation and post-evacuation, and also the area of application of suction, including the length of the suction region in the direction of travel of the web.

With prior art coating apparatus and techniques of this general class, it is often possible to attain desired degrees of adhesion with very heavy coats of the thermoplastic substances. However, as the weight of the coating is diminished down to, for example, 6 or 7 pounds per ream of the thermoplastic (or lighter) and such conventional prior art coating apparatus and methods are employed, the aforementioned adhesion problems become severe and have, before this invention, been insoluble at the maxium attainable speeds of the prior art. However, in the present invention it is possible to select the various factors above mentioned and to attain extraordinarily low coating weights and in fact coating weights not heretofore possible of attainment and with the very high fiber-locking or pulling degree of adhesion and also at very high web speeds, that is, at web speeds that are high and commercial practicable.

At the present time the actual lowermost limit of the weight of the weight of the coating which may be applied by the apparatus and methods embodying the present invention to achieve an article also embodying one form of such invention, is not known, however, a typical example of the very low weight coating achieved by the present invention is that aforementioned in the neighborhood of 2 pounds of polyethylene per ream with the degree of adhesion characterized by such fiber-pulling qualities as above described, and at a web speed between 500 feet per minute and 1,200 feet per minute.

The novel article embodying the present invention is superior to that of the prior art because it is not subject to one of the principal disadvantages of the latter, namely, easy delamintaion due to improper adhesion of the coating to the porous substrate. Furthermore, the apparatus and the method embodying the present invention is not subject to the very serious disadvantage of the prior art wherein delamination of the laminate occurs due to the adhesion of the plastic film to a chilled roll. The degree of adhesion achieved in the present invention between the porous substrate and the plastic film is sufficiently high successfully to resist at all times any such delamination.

Referring to the extruder 26 as shown in FIG. 1 and also the extruder of FIG. 8, the type of such extruder is, of course, one which exerts pressure upon the thermoplastic by any suitable means, such as by the turning of a screw in a manner well known in the art. In all embodiments of the present invention where a thermoplastic substance is employed, there are two factors which act thereupon, namely, pressure and heat, this being essential to accomplish the extrusion. The force or pressure may be effected by means of such screw, in one advantageous form of the invention, although the latter is not limited thereto and it is possible to employ other means for exerting pressure upon the plastic, for example, a ram.

In the application of heat to the thermoplastic substance, the increments of such substance within the extruder which are farthest removed from the heated surfaces thereof, are not heated as much as those increments of the substance which are closer to the heating surfaces. Hence, under some circumstances it is possible to encounter difficulties due to differences in viscosity of the thermoplastic substance within the extruder. This can be avoided by proper selection of the extrusion temperature under conditions above described in connection with the viscosity curves of the polyethylene, polypropylene and nylon.

The objective of the extrusion device is, of course, to deliver a uniform hot melt to the extrusion die. If the extruder is operating properly, the temperature throughout such substance will be substantially homogeneous as will be its viscosity. However, at some temperatures non-uniformity of the temperature of the thermoplastic has a more significant effect upon the draw characteristics thereof, and also the viscosity thereof, and usually this becomes of greater significance at the higher ranges of extrusion temperatures.

There is thus provided novel apparatus and method for extrusion coating of porous substrates wherein one of the principal characteristics comprises, in one form thereof, the employment of a low hot draw or stretch gap of the order of 1 inch to 1½ inches. The significance of this characteristic is that it reduces the heat losses as aforementioned in the coating substance because the substance travels over a shorter distance than heretofore possible. Also the employment of such low hot stretch gap has the following advantages:

(a) It improves the draw or taper characteristics;

(b) It improves the adhesion due to lower heat loss in the plastic film;

(c) There is achieved a lower "neck-in" along the edges of the web which results in substantially eliminated edge beading or substantially lessened edge beading;

(d) There is less hot draw resonance.

Referring to the "neck-in" and edge beading above mentioned, the longer the hot stretch gap, the greater the diminution of the width of the extruded film. The greater such "neck-in" the greater the amount of edge beading. Hence the significance of the reduction of the hot stretch gap by the present invention because of the minimization to a degree not heretofore attained of the amount of such "neck-in" and hence the minimization of the edge beading or the substantially complete elimination thereof.

The present invention has particular advantages, as aforementioned, for the application of thin coatings of the order of 2 pounds of the thermoplastic, for example, of polyethylene per ream of paper. Furthermore, there are very substantial advantages in the coating of the aforementioned creped, embossed and extensible papers with a heavy coating of the order of 14.4 pounds per ream, namely, 1 mil in thickness and heavier. Consequently, although the advantages of the present invention in the coating of conventional porous paper, such as 40 pound natural kraft, are largely found in the application of heretofore unattained light coatings with high adhesion and at very high speeds, further important advantages are found in the application of heavy coatings to such extensible types of paper.

In all of the prior art methods, apparatus and articles of this type, the lightweight coatings which have been applied can be easily peeled off and thus the degree of adhesion is very low. However, in the present invention the degree of adhesion is extraordinarily high along with the aforementioned factor of very low weight. It is not possible to peel off a low weight plastic coating adhered to a porous substrate in accordance with and embodying the present invention without pulling away the fibers of the porous substrate, such as paper, and in that effect destroying the laminated structure. Delamination of a laminate made in accordance with the present invention and embodying same is impossible without pulling off the fibers of the porous substrate and thus achieving the aforementioned fiber-pulling adhesion.

With respect to the factor of the selection of the degree of adhesion of the plastic film to the porous substrate embodying the present invention, there are some embodiments in which relatively low adhesion may be desired and other embodiments in which high adhesion is wished. Thus in some applications of the product embodying the present invention, it may be desired to achieve a high shear strength and this can be facilitated by achieving a relatively low adhesion coating. Such relatively low adhesion of the coating will provide a greater stretchability of such coating when a shear occurs and hence will, by virtue of its stretchable character, resist the shear whereas if the degree of adhesion is high and the coating is deeply penetrated into the fibers, the shearing of the plastic coating will take place concurrently with the shearing of the porous substrate or paper and hence the resistance to such shear of the laminate will be considerably less than if the adhesion were lower.

Reverting again to the forms of the invention and wherein the apparatus and the method and also the article produced thereby all embodying the invention are employed for the coating of extensible paper, the plastic coating, by virtue of its stretchability, is capable of following the two-way stretching of such types of papers and hence considerable strength is added to the resulting laminate and considerable integrity is imparted to it as a container for divided substances and for liquids.

Reverting to a comparison of the present method and apparatus to prior art method and apparatus involving a pressure nip between a chill and a pressure roll, the pressing of the substrate and thermoplastic film in such nip results in extremely rapid cooling of the film, which cooling effect is more rapid as the film grows thinner. The thermoplastic coating immediately on contact with the porous substrate web in the nip thus, for example, can be cooled, as in the case of nylon, from well above its melting point to a point well below its solidification point within a very short distance and prior to the plastic substance forming a strong bond with the porous substrate. In other words, the prior art technique causes premature solidification to the detriment of the bond, this being particularly true for thin plastic films.

On the other hand, in the present invention the film of thermoplastic substance is extruded onto the porous substrate at a selected line or region of contact which is subjected to a vacuum and there is no heat removed from the film except due to ambient temperature conditions, and in some instances heat is applied to the film after contact as by radiant or induction heating means. Thus the molten film from the first contact with the moving substrate is caused to penetrate into the latter by the action of the suction (or other ambient pressure differential) and while it is still sufficiently well above its solidification point to achieve relatively much deeper penetration than by prior art techniques. The penetration takes place between the aforementioned first contact and the termination of the suction area, this dimension extending in the direction of web movement. Thereafter the film is solidified by any suitable means or step, for example, by a chill roll or the removal of heat as by passing the web through a region in which the ambient temperature is adequate for this purpose.

Such dimension over which the suction is exerted is selected to accomplish the desired penetration to achieve the degree of adhesion required, for example, the fiber-pulling adhesion as in the case of extremely thin coatings in the range of 0.10 mil to 10 mils.

The benefit of employing a thermoplastic resin of relatively wide melting point, such as polypropylene 132a (FIG. 19), in the method and apparatus embodying the present invention, is that a greater heat loss can be tolerated following contact between the film and the substrate, as compared to the heat loss which can be tolerated in the case of a plastic having a sharp melting point, such as nylon 133a, it being assumed that extrusion of the plastic substance occurs in both instances at approximately the same temperature. But by virtue of the present invention it is possible successfully to employ thermoplastic resins of sharp melting point, for example, synthetic linear polymers, such as nylon, and to achieve extremely lightweight coatings, together with a degree of adhesion heretofore unattained, namely, fiber-pulling adhesion, and at commercial speeds.

Also, such thermoplastic substances embracing the synthetic linear polymers of sharp melting point may successfully be employed despite relatively high solidification points of the substance, for example, nylon as represented in FIGS. 19 and 21, and still obtain the advantages enunciated in the preceding paragraph.

Consequently, certain of the principal characteristics of the present invention reside in (a) refraining from removal of heat from the molten film after extrusion thereof and during the application of suction thereto (or other ambient pressure differential) and while the bond is being formed; (b) selecting the time during which each increment of substrate is subjected to suction; (c) selecting the degree of suction; (d) selecting the amount of heat applied to the film both before and after contact with the substrate; and (e) selecting the amount of heat applied to the substrate prior to such contact—all to the end of achieving, as in one form of the invention, a very high degree of adhesion (fiber-pulling adhesion) for extremely thin coatings of thermoplastic resin (e.g., down to 0.10 mil) and at commercial speeds.

What is claimed is:

1. The method of progressively applying an adherent coating of a thermoplastic resin to a fibrous and porous web, which comprises: continuously hot extruding said resin through a slotted orifice into plastic sheet and feeding said sheet into contact with a surface of said web at a coating station spaced from said orifice and while progressively feeding said web past said station at a rate substantially exceeding the rate of said resin extrusion, thereby to hot stretch said plastic sheet prior to application to said web, and while applying a gas pressure differential over an area of the so-coated web of lower pressure on the uncoated web surface, thereby adherently to bond said plastic coating to said web.

2. The method of progressively applying an adherent coating of a thermoplastic resin to a fibrous and porous web, which comprises: continuously hot extruding said resin through a slotted orifice into plastic sheet and feeding said sheet into contact with a surface of said web at a coating station spaced from said orifice, and while progressively feeding said web past said station at a rate exceeding the rate of said resin extrusion, thereby to hot stretch said plastic sheet prior to application to said web, and while applying a gas pressure differential over an area of the so-coated web of lower pressure on the uncoated web surface, and thereafter progressively cooling the so-coated web below the setting temperature of said resin, thereby permanently to bond said plastic sheet to said web.

3. A process for adherently coating a continuous web of porous and fibrous material, with a surface film of thermoplastic resin, which comprises: continuously hot extruding said resin into a plastic film at an extruding station, and while progressively feeding said web past a coating station spaced from said extruding station, feeding said plastic film as extruded into surface contact with a surface of said web at said coating station while applying sufficient vacuum to the opposite surface of said web to draw said film into substantially continuous surface engagement with said web and embed surface fibers of said web in said resin film, and feeding the so-coated web thence past a cooling station maintained at a temperature sufficiently low to cool said film below the setting temperature of said resin, thereby permanently to bond said film to said web.

4. The method in accordance with claim 1 wherein spaced filaments are applied to the web, these filaments being bonded to the web by means of the plastic film.

5. A method of progressively adherently coating a continuous porous web with a thin coating of thermoplastic resin, which comprises: heating said resin, continuously extruding said resin in a viscous condition through a slotted orifice forming a plastic sheet, passing said sheet through an air gap between said orifice and a coating station, hot stretching said sheet while passing through said air gap, progressively feeding said web past the coating station, feeding said hot stretched sheet into contact with a surface of said web at the coating station while applying a vacuum to the opposite surface of said web.

6. A process for coating a continuous porous web with a thin film of thermoplastic sheet forming resin, which comprises: continuously hot extruding said resin into a plastic film having a weight between about 2 and about 14.4 pounds per 3,000 square feet of surface of the web at an extruding station, while progressively feeding said web past a coating station at a speed with respect to said extruding station of between about 500 and about 1,500 feet per minute, feeding said plastic film as extruded into surface contact with a surface of said web at said coating station, applying a vacuum to the opposite surface of said web from a location disposed before said coating station and extending to a location beyond said coating station, said vacuum being sufficient to prevent the formation of air blisters between the film and the web and to embed the surface fibers of said web in said resin film.

7. A process for coating a continuous, porous web with a thin film of thermoplastic resin, which comprises: continuously hot extruding said resin into a plastic film having a weight between about 2 and about 14.4 pounds per 3,000 square feet of surface of the web at an extruding station, while progressively feeding said web past a coating station at a speed with respect to said extruding station of between about 500 and about 1,500 feet per minute, said coating station being spaced from said extruding station between about ¼ inch and about 8 inches, feeding said plastic film as extruded into surface contact with a surface of said web at said coating station while applying sufficient vacuum to the opposite surface of said web to draw said film into substantially continuous surface engagement with said web, and feeding the so-coated web thence past a cooling station maintained at a temperature sufficiently low to cool said film below the setting temperature of said resin, thereby permanently to bond said film to said web.

8. A process for coating a continuous, porous web with a thin film of thermoplastic resin chosen from the group consisting of polyethylene, polypropylene and polyamides of the nylon type, which comprises: continuously extruding said resin in a molten condition through a slotted orifice to produce a coating film having a weight between about 2 and about 14.4 pounds per 3,000 square feet of surface of the web, while moving the web relative to such orifice at a speed of between about 500 and about 1,500 feet per minute, feeding said film into surface contact with the surface of said web at a coating line, said coating line being disposed between about ¼ inch and about 8 inches from said orifice, applying sufficient vacuum to the opposite surface of said web from a location before said coating line and extending to a location beyond said coating line that is sufficient to prevent the formation of air blisters and to embed surface fibers of said web in said resin film.

9. A process for coating a continuous, porous web with a thin film of thermoplastic resin chosen from the group consisting of polyethylene, polypropylene and polyamides of the nylon type, which comprises: continuously extruding said resin in a viscous condition through a die to produce a coating film having a weight between about 2 and about 14.4 pounds per 3,000 square feet of surface area of the web, while moving the web relative to the die at a speed of about 500 and about 1,500 feet per minute, at a coating line spreading the film on the surface of said web following the natural surface contour of the web while applying sufficient vacuum to the opposite surface of said web from a location just before said coating line and extending to a location beyond said coating line sufficient to prevent the formation of air blisters and to draw said film into intimate engagement with said web, and feeding the so-coated web thence past a cooling station maintained at a temperature sufficiently low to cool said film below the setting temperature of said resin, and thereby permanently to bond said film to said web.

References Cited by the Examiner
UNITED STATES PATENTS

| | | | |
|---|---|---|---|
| 1,962,682 | 6/34 | Case | 154—50 |
| 2,311,572 | 2/43 | Reynolds | 154—50 |
| 2,679,887 | 6/54 | Doyle et al. | 156—183 |

(Other references on following page)

UNITED STATES PATENTS

| | | | |
|---|---|---|---|
| 2,681,294 | 6/54 | Begiun | 117—34 |
| 2,715,088 | 8/55 | Gunning | 156—167 |
| 2,788,051 | 4/57 | Tuttle | 154—1 |
| 2,897,109 | 7/59 | Voightman | 156—164 |
| 2,944,586 | 7/60 | Yanulis | 154—50 |
| 2,954,817 | 10/60 | Havemann | 154—1.76 |
| 3,034,738 | 7/62 | De Meter et al. | 156—229 |

FOREIGN PATENTS

| | | |
|---|---|---|
| 728,203 | 4/55 | Great Britain. |
| 784,503 | 10/60 | Great Britain. |
| 826,290 | 12/59 | Great Britain. |
| 1,210,896 | 10/59 | France. |
| 220,509 | 2/59 | Australia. |

EARL M. BERGERT, *Primary Examiner.*

CARL F. KRAFFT, *Examiner.*